United States Patent [19]

Sasayama et al.

[11] 4,455,980

[45] Jun. 26, 1984

[54] ENGINE COMBUSTION CONTROL METHOD

[75] Inventors: Takao Sasayama; Matsuo Amano, both of Hitachi; Takeshi Hirayama, Mito; Shinichi Sakamoto, Hitachi; Masayuki Miki, Katsuta, all of Japan

[73] Assignee: Hitachi, Ltd., Tokyo, Japan

[21] Appl. No.: 300,585

[22] Filed: Sep. 9, 1981

[30] Foreign Application Priority Data

Sep. 12, 1980 [JP] Japan ............................... 55-125947

[51] Int. Cl.³ ................................................ F02P 5/04
[52] U.S. Cl. ....................................... 123/425; 123/435
[58] Field of Search ................................ 123/425, 435

[56] References Cited

U.S. PATENT DOCUMENTS

| | | | |
|---|---|---|---|
| 3,875,912 | 9/1975 | Bullo | 123/425 |
| 3,957,023 | 5/1976 | Peterson | 123/425 |
| 4,116,173 | 9/1978 | McDougal | 123/425 |
| 4,120,272 | 10/1978 | Douaud | 123/425 |
| 4,153,019 | 5/1979 | Laubenstein | 123/425 |
| 4,213,429 | 7/1980 | Douaud | 123/425 |
| 4,242,995 | 1/1981 | Schramm | 123/425 |
| 4,265,205 | 5/1981 | Garcea | 123/425 |
| 4,285,315 | 8/1981 | Douaud | 123/425 |
| 4,304,203 | 12/1981 | Garcea | 123/425 |

Primary Examiner—Ronald B. Cox
Attorney, Agent, or Firm—Antonelli, Terry & Wands

[57] ABSTRACT

A sensor for detecting the internal pressure is provided in the cylinder to detect the combustion condition in the engine cylinder. In order to process the output of the sensor in accordance with the volume of the combustion chamber, the amount of change of combustion volume between timings of fetching the sensor outputs is multiplied by the sensor output, or the sensor output is fetched in accordance with the amount of change of combustion volume. In this way, the amount of work is detected from the sensor output. The ignition timing is subjected to feedback control in such a manner as to attain the maximum effective amount of work.

14 Claims, 23 Drawing Figures

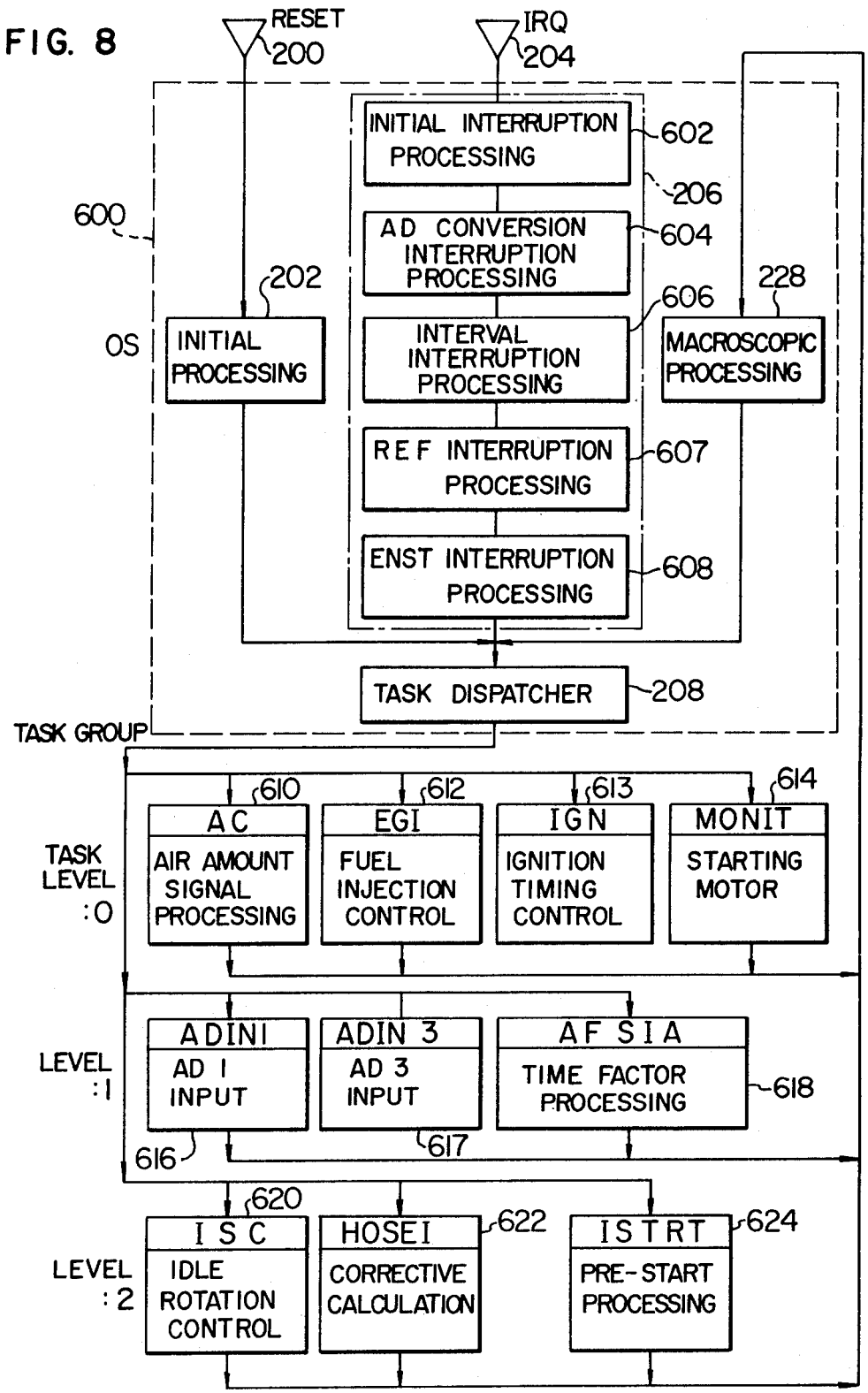

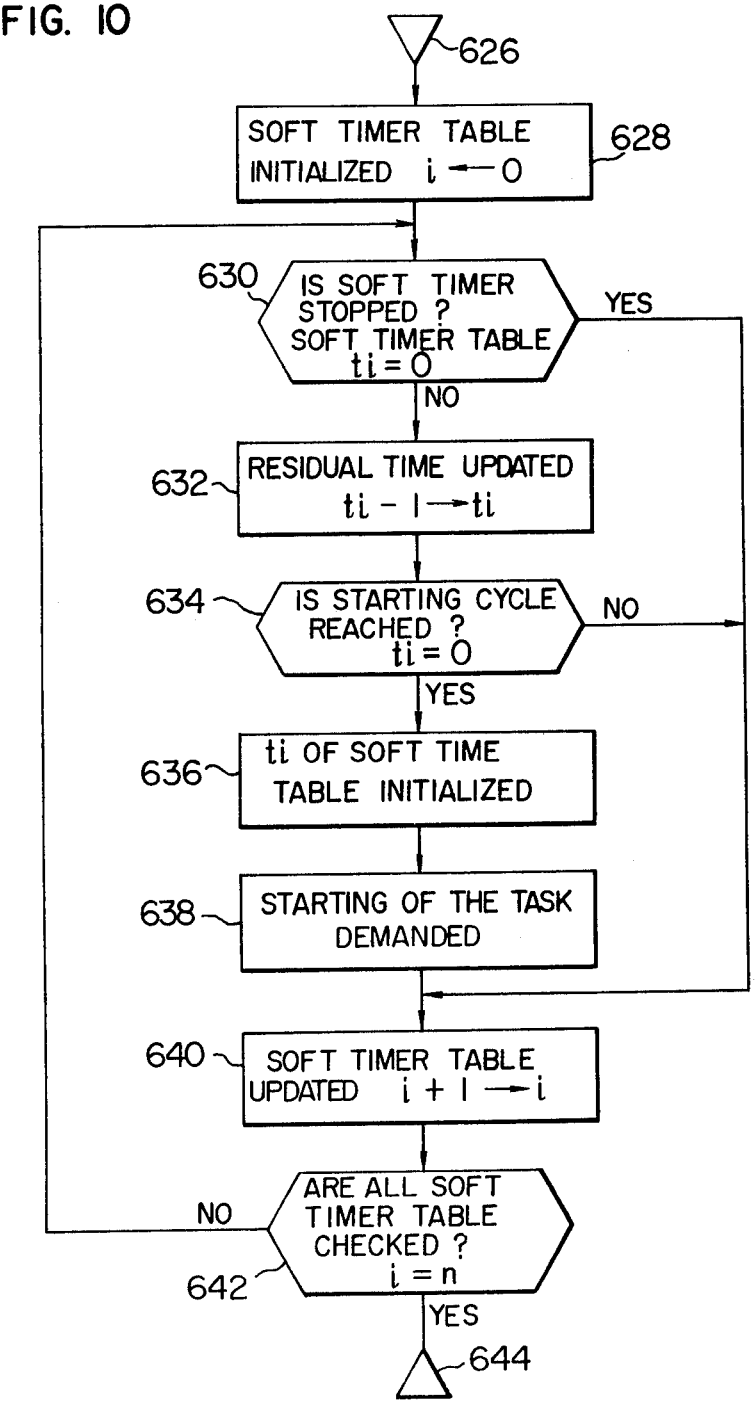

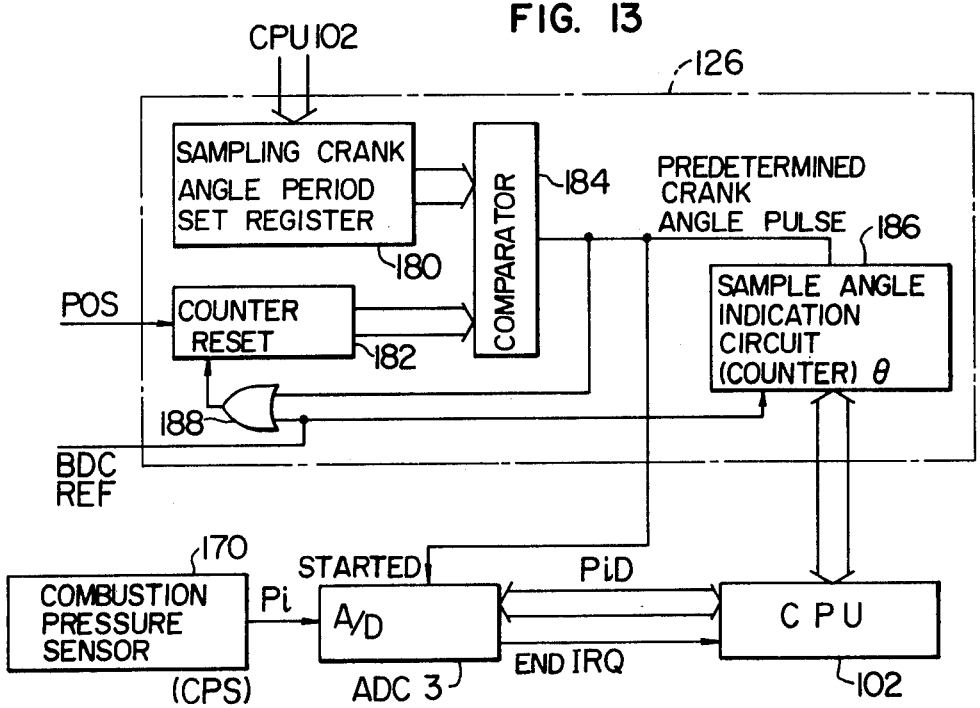
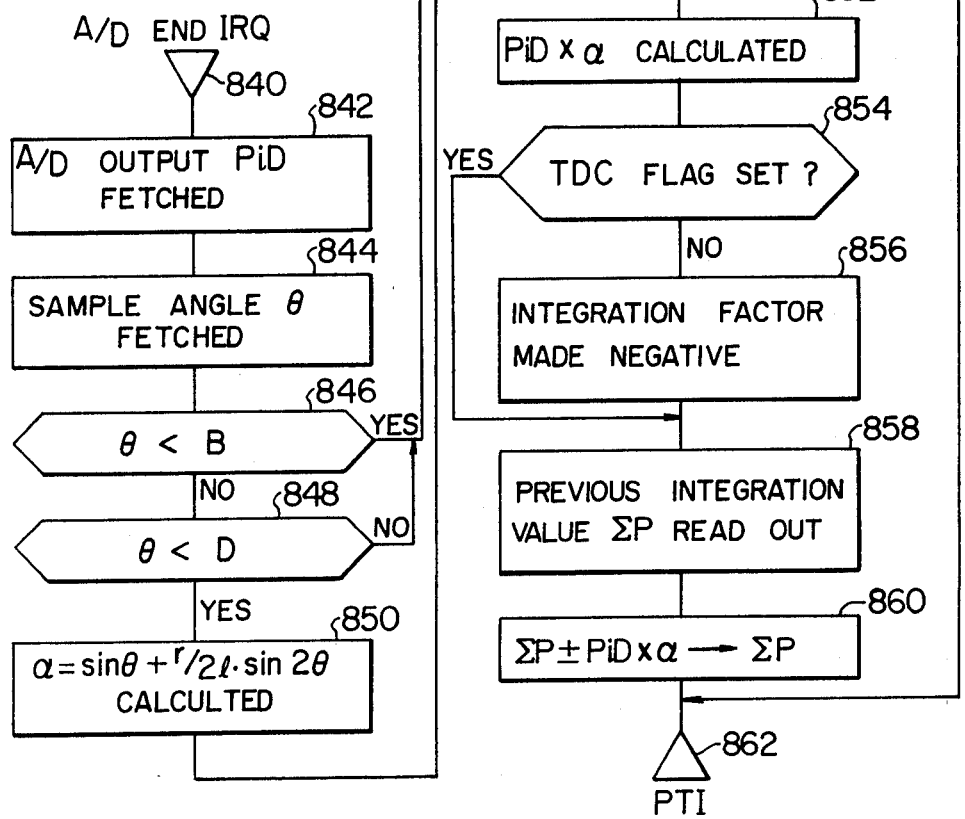

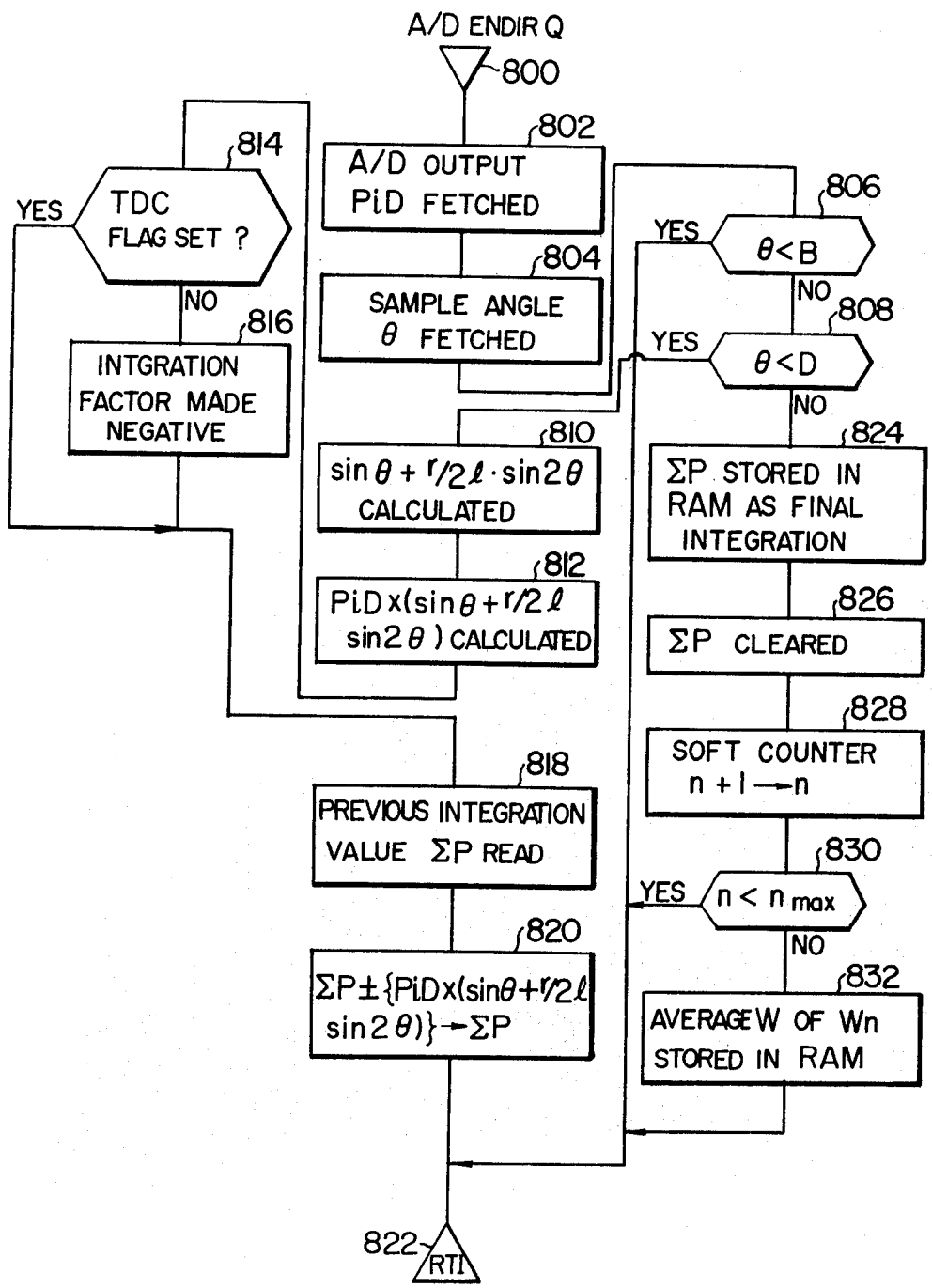

D𝜑 INCREASED AND CENTRAL VALUE SHIFTED LEFTWARD

D𝜑 DECREASED AND CENTRAL VALUE SHIFTED RIGHTWARD

ENGINE COMBUSTION CONTROL METHOD

FIELD OF THE INVENTION

The present invention relates to an engine control method in which a combustion condition of the engine is detected and the detection value of the combustion condition is controlled to a predetermined state.

BACKGROUND OF THE INVENTION

Conventionally, a feedback system was developed in which an engine combustion condition was detected so as to determine the amount of engine control and the combustion condition was controlled in accordance with the amount of determined engine control. A problem in this conventional method is the unstable operation of the feedback system. As a result of studying the cause of this problem, it has been determined that in conventional feedback systems the detection of the engine combustion condition is effected in accordance with the change of engine crank angle and the sensor output is processed as a function of crank angle, thus making correct detection of the combustion conditions impossible.

SUMMARY OF THE INVENTION

An object of the present invention is to provide an engine control method with a stable feedback system in which the engine combustion condition is detected and feedback control is effected on the basis of the result of such detection to thereby control the combustion condition.

A feature of the present invention resides in the fact that the data representing the combustion condition is processed taking into consideration the change in the volume of the engine combustion chamber. There are two specific methods available for this purpose:

1. The combustion conditions are repeatedly detected, and each detected combustion condition is corrected by a change in the volume of the combustion chamber between detection timings.

2. The repeated detection timing of the combustion condition is determined in accordance with a predetermined change of the volume of the combustion chamber, so that the detection value corrected in accordance with the change of the combustion chamber is used as a constant.

BRIEF DESCRIPTION OF THE DRAWINGS

The above and other objects, features and advantages will be made apparent by the detailed description taken in conjunction with the accompanying drawings, in which:

FIG. 8 is a diagram showing a specific flow of operation;

FIG. 10 is a diagram showing a process flow for an INTV (interval) interruption processing program;

FIG. 13 is a block diagram showing the essential parts of a pressure signal processing circuit in the control system of FIG. 7;

FIG. 14 is a diagram showing the process flow of an AD conversion end interruption processing program in the case where a combustion pressure sensor is provided in each engine cylinder;

FIG. 15 is a diagram showing the process flow an AD conversion end interruption processing program in the case where combustion pressure sensor is provided only in a specified cylinder of the engine;

DETAILED DESCRIPTION

Figure 1:
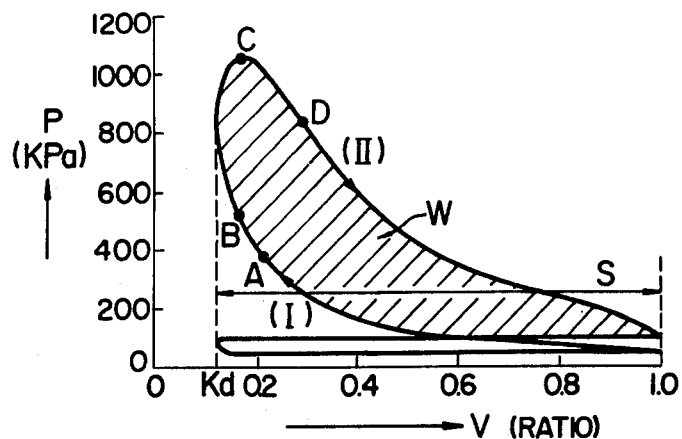
FIG. 1 is a P-V diagram in one cycle of an internal combustion engine.

Embodiments of the present invention will be described below with reference to the accompanying drawings. FIG. 1 shows a P-V diagram for one cycle of the engine. In FIG. 1, combustion is started at point A, where ignition is started, followed by rapid combustion. The maximum pressure is reached at point C, and combustion ends at point D. In other words, in this diagram, a negative torque is generated at arrow (I) and a positive torque is generated at arrow (II). Thus in FIG. 1, the area represented by the shadowed part is equivalent to the effective amount of work in one cycle of the engine, which amount of work W is expressed by the equation below.

$$W = \oint P dV \tag{1}$$

Figure 2:
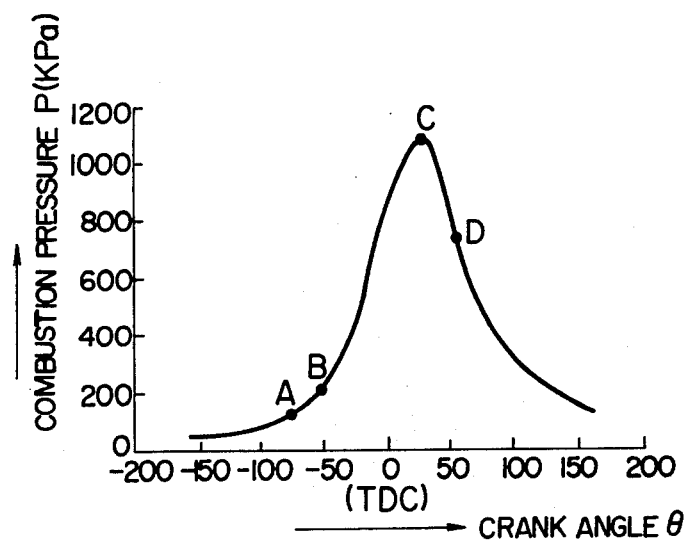
FIG. 2 is a diagram showing a combustion pressure characteristic in the compression-combustion stroke in FIG. 1.

In FIG. 1, reference character s denotes a piston stroke. FIG. 2 shows a combustion-pressure characteristic for the compression-combustion stroke of the P-V diagram in FIG. 1. The reference symbols in this drawing show the same conditions as in FIG. 1.

Figure 3:
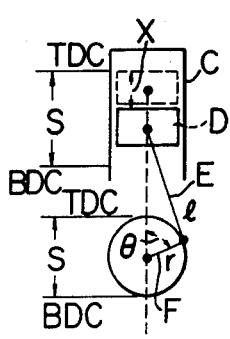
FIG. 3 is a diagram for explaining the relation between the crank angle $\theta$ and the piston displacement x.

The relation between the piston displacement x and the crank angle $\theta$ is shown in FIG. 3. In this diagram, the displacement x of the piston D is given by the equation below.

$$x = \frac{s}{2}\left[(1 - \cos\theta) + \frac{r}{4l}(1 - \cos2\theta)\right] \quad (2)$$

where l is the length of the shaft E coupled to the piston D, r the length of the crank connected to the shaft E, s the stroke of the piston D, and $\theta$ the crank angle.

Let the sectional area of the cylinder be A. Then the volume V of the cylinder is expressed as $$V = A \cdot x = \frac{As}{2}\left[(1 - \cos\theta) + \frac{r}{4l}(1 - \cos2\theta)\right] \quad (3)$$

The minute volume dV is given as $$dV = \frac{A \cdot s}{2}\left[\sin\theta + \frac{r}{2l}\sin2\theta\right]d\theta \quad (4)$$

or $$dV = A \cdot dx \quad (5)$$

Thus the effective amount of work is expressed as $$W = \phi PdV = \frac{As}{2}\phi P\left[\sin\theta + \frac{r}{2l}\sin2\theta\right]d\theta \quad (6)$$

or $$W = \phi PdV = A\phi Pdx \quad (7)$$

From equations (6) and (7) above, the effective amount of work W (torque) is determined on the basis of the pressure data supplied from the combustion pressure sensor detected for each predetermined displacement dx or predetermined crank angle $d\theta$.

A specific method of signal processing for the torque W mentioned above will be described later.

Figure 4:
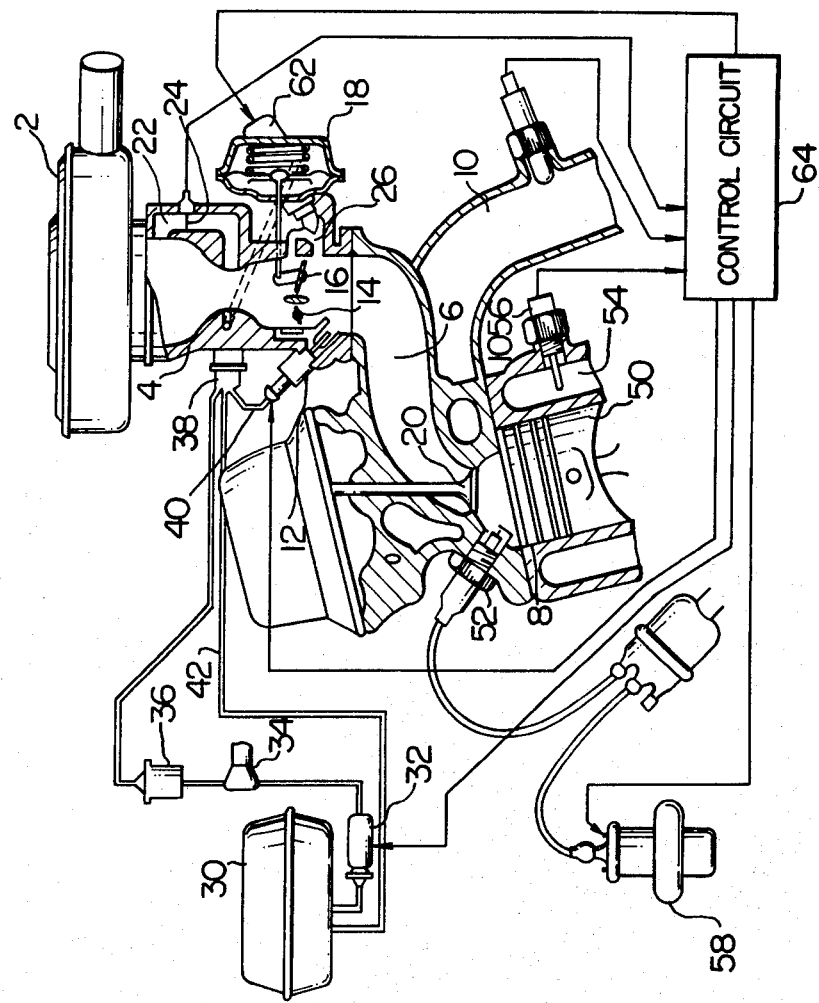
FIG. 4 is a diagram showing a configuration of the control of the engine system in general.

A control system for the engine system in general is shown in FIG. 4. In this drawing, the air taken in is supplied to a cylinder 8 through an air cleaner 2, a throttle chamber 4 and an intake manifold 6. The gas produced by the combustion in the cylinder 8 is exhausted into the atmosphere through the exhaust manifold 10 from the cylinder 8.

The throttle chamber 4 is provided with an injector 12 for injecting the fuel. The fuel injected from this injector 12 is atomized in the air path of the throttle chamber 4 and mixed with the intake air to thereby form a mixture gas. This mixture gas is supplied through the intake manifold 6 to the combustion chamber of the cylinder 8 by way of the opening of the intake valve 20.

Throttle valves 14 and 16 are provided near the outlet of the injector 12. The throttle valve 14 is formed to mechanically communicate with the accelerator pedal driven by the driver. The throttle valve 16, on the other hand, is arranged to be driven by a diaphragm 18, and closed up in response to a small air flow rate. With the increase in a air flow rate, the negative pressure against the diaphragm 18 is increased so that the throttle valve 16 begins to open thereby to dampen the increase of intake resistance.

An air path 22 is provided upstream of the throttle valves 14 and 16 of the throttle chamber 4. This air path 22 contains an electrical heater element 24 making up a thermal air flowmeter, which produces an electrical signal subject to change with the air flow velocity and determined by the relation between the air flow velocity and the amount of heat transmission of the heater element. The heater element 24, which is provided in the air path 22, is protected from the high temperature gas generated at the time of a back fire on the one hand and the contamination by the dust or the like in the intake air on the other hand. The outlet of this air path 22 is opened to a point near the narrowest part of the venturi, while the inlet thereof is opened upstream of the venturi.

The fuel supplied to the injector 12 is imparted to the combustion pressure regulator 38 from the fuel tank 30 through the fuel pump 32, the fuel damper 34 and the filter 36. On the other hand, a pressurized fuel is supplied from the combustion pressure regulator 38 to the injector 12 through the pipe 40. The fuel is returned from the combustion pressure regulator 38 to the fuel tank 30 through the return pipe 42 in such a manner that the difference between the pressure in the intake manifold 6 to which the fuel is injected from the injector 12 and the fuel pressure to the injector 12 is kept constant.

The gas mixture taken in from the intake valve 20 is compressed by the piston 50, and ignited by the spark started by the spark plug 52. This combustion is converted into kinetic energy. The cylinder 8 is cooled by the cooling water 54. The temperature of the cooling water is measured by the water temperature sensor 56, and the resulting measurement is used to represent engine temperature. The spark plug 52 is supplied with a high voltage from the ignition coil 58 at the correct ignition timing.

A crankshaft (not shown) is provided with a crank angle sensor for producing a reference angle signal and a position signal for each reference crank angle and a predetermined angle (such as 1.0 degree) respectively in accordance with the rotation of the engine crankshaft.

The output of the crank angle sensor, the output of the water temperature sensor 56 and the electrical signal from the heater element 24 are applied to a control circuit 64 including a microcomputer and the like. The signals thus applied to the control circuit 64 are processed in the control circuit 64, the output of which drives the injector 12 and the ignition coil 58.

In the engine system controlled by the abovementioned circuit construction, the throttle chamber 4 is provided with a bypass 26 communicating with the intake manifold 6 over the throttle valve 16. The bypass 26 includes a bypass valve 62 controlled to open and close. The drive section of this bypass valve 62 is supplied with a control input from the control circuit 64 for control of the opening and closing operation thereof.

The bypass valve 62 faces the bypass 26 circumventing the throttle valve 16 and is subject to opening and closing control by a pulse current. According to the amount of lift of this bypass valve 62, the sectional area of the bypass 26 is changed. The amount of lift is controlled by the drive system driven by the output of the control circuit 64. Specifically, in the control circuit 64, an open cycle signal for controlling the drive system is generated, and the drive system supplies the drive section of the bypass valve 62 with a control signal for regulating the amount of lift of the bypass valve 62 in response to the open cycle signal.

Figure 5:
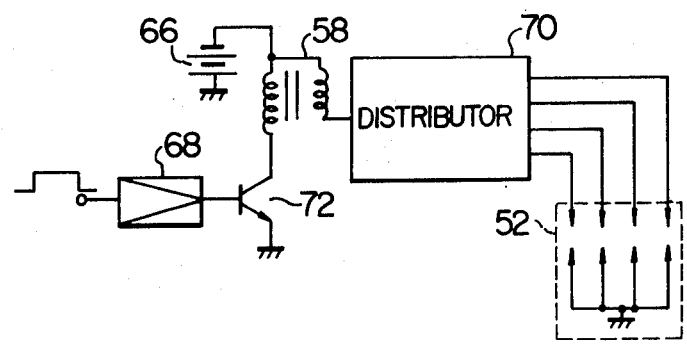
FIG. 5 shows a configuration of the ignition system in FIG. 4.

FIG. 5 is a diagram for explaining the ignition system of FIG. 4. A pulse current is supplied to a power transistor 72 through an amplifier 68. The transistor 72 is turned on by this current. As a result, a primary coil current flows from the battery 66 to the ignition coil 58. At the fall of this pulse current, the transistor 74 is cut off, thus generating a high voltage in the secondary winding of the ignition coil 58.

This high voltage causes a high voltage to be distributed to the spark plugs 52 of the engine cylinders through the distributor 70 in synchronism with the engine rotation.

Figure 6:
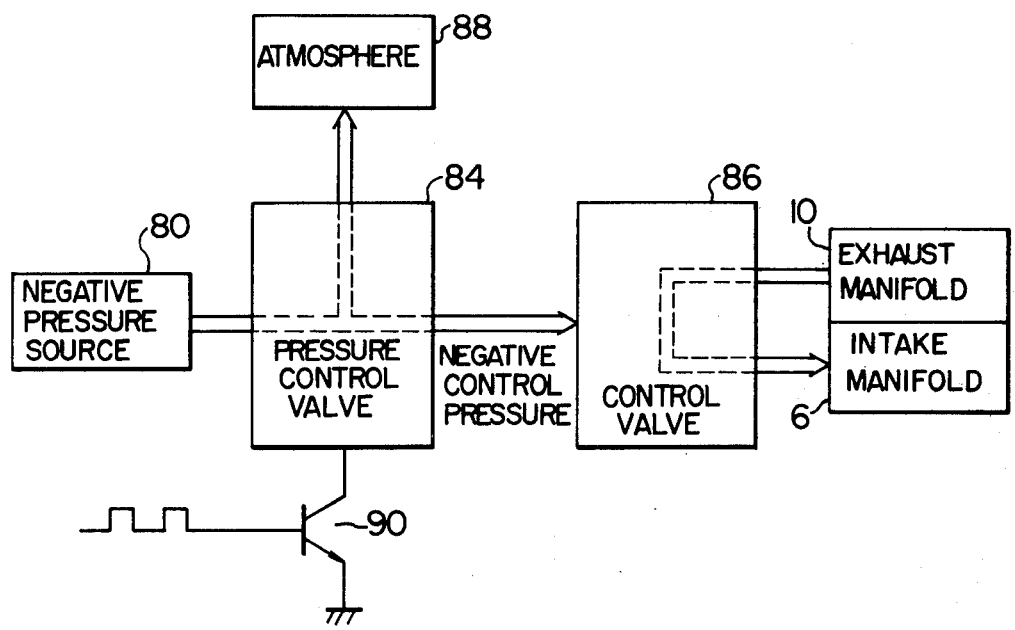
FIG. 6 shows a configuration diagram for explaining an exhaust gas reflux system.

FIG. 6 is for explaining the exhaust gas reflux (hereinafter referred to as EGR sometimes) system. The negative pressure of the negative pressure source 80 is applied through the pressure control valve 84 to the control valve 86. In accordance with the duty ratio of the repetitive pulses applied to the transistor 90, the pressure control valve 84 controls the ratio of release of the negative pressure from the negative pressure source into the atmosphere 88 thereby to regulate the application of the negative pressure to the control valve 86. In this way, the negative pressure applied to the control valve 86 is determined by the duty ratio of the transistor 90. The negative control pressure of this pressure control valve 84 is used to control the amount of EGR to the intake manifold 6 from the exhaust manifold 10.

Figure 7:
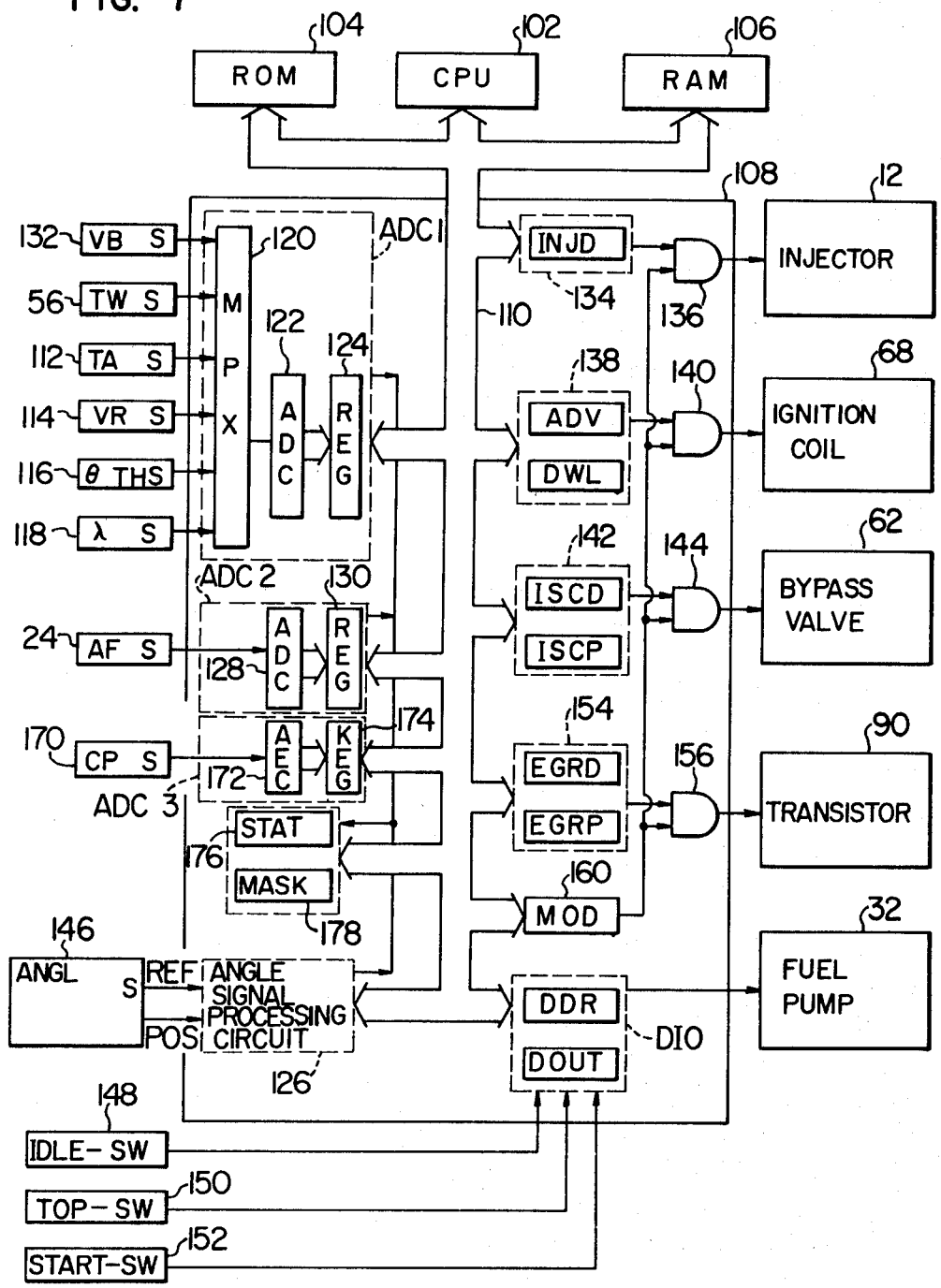
FIG. 7 shows a general configuration of an engine control system.

The general configuration of the control system is shown in FIG. 7. The control system comprises a central processing unit (CPU) 102, a read-only memory 104 (hereinafter sometimes referred to as ROM), a random access memory 106 (hereinafter sometimes referred to as RAM) and an input-output circuit 108. The central processing unit 102 processes the input data from the input-output circuit 108 in accordance with the various programs stored in the read-only memory 104, and returns the result of processing to the input-output circuit 108. The intermediate data required for these processing operations are stored in the random access memory 106. Data transfer between the central processing unit 102, the read-only memory 104, the random access memory 106 and the input-output circuit 108 is effected by a bus line 110 including a data bus, a control bus and and an address bus.

The input-output circuit 108 includes such input means as a first analog-digital converter ACD1, a second analog-digital converter ADC2, an angle signal processing circuit 126 and a discrete input-output circuit for receiving and producing 1-bit data.

In the first analog-digital converter, the multiplexer (MPX) 120 is supplied with outputs from a batery voltage sensor (VBS) 132, a cooling water temperature sensor (TWS) 56, an atmospheric temperature sensor (TAS) 112, a regulation voltage generator (VRS) 114, a throttle angle sensor (θTHS) 116, and a λ sensor (λS) 118. One of these outputs is selected by the multiplexer 120 and is applied to the analog-digital converter circuit 122. The digital value produced from the analog-digital converter circuit 122 is held in the register 124.

The output of the flow rate sensor 24 is applied to the second analog-digital converter circuit and converted into a digital value through the analog-digital converter circuit 128. The resulting digital value is set in the register 130.

Further, the detection output of the combustion pressure sensor 170 is applied to the third analog-digital converter and converted into a digital value by the analog-digital converter circuit 172 so that the result of analog-digital conversion is set in the register 174.

The crank angle sensor 146 produces a signal REF representative of the reference crank angle such as 180 degrees and a signal POS indicative of a minute crank angle such as 1 degree, which signals are applied to the angle signal processing circuit 126 for waveform shaping.

The discrete input-output circuit is supplied with the outputs of the idle switch 148, the top gear switch 150 and the starter switch 152.

Explanation will be made now of the object of control and a pulse output circuit based on the result of calculation by the central processing unit. The injector control circuit is for converting the digital value resulting from the calculation into a pulse output. Thus a pulse having a width corresponding to the amount of fuel injection is produced at the injection control circuit 134 and applied through the AND gate 136 to the injector 12.

The ignition pulse generator circuit 138 includes a register ADV for setting the ignition timing and a register DWL for setting the current conduction start time of the ignition coil. These data are set from the central processing unit. On the basis of the data thus set, a pulse is generated and applied through the AND gate 140 to the amplifier 68 described in detail with reference to FIG. 2.

The opening rate of the bypass valve 62 is controlled by the pulse applied from the control circuit ISCC 142 through the AND gate 144. The control circuit ISCC 142 includes a register ISCD for setting the pulse width and a register ISCP for setting a repetitive pulse period.

The EGR amount control pulse generator circuit 180 for controlling the register 90 which in turn controls the EGR control valve 86 shown in FIG. 6 includes a register EGRD for setting a value representative of a pulse duty and a register EGRP for setting a value indicative of the repetitive period of the pulse. The output pulse of the EGR amount cottrol pulse generator circuit 180 is applied through the AND gate 156 to the transistor 90.

The 1-bit input-output signal is controlled by the discrete input-output circuit. The input signals include the signals from the idle switch, the top gear switch and the starter switch. The output signal, on the other hand, includes a pulse output signal for driving the fuel pump. The discrete input-output circuit includes a register DDR for determining whether the terminal should be used as an input terminal or an output terminal, and a register DOUT for latching the output data.

The register MOD 160 is for holding the command specifying the various conditions in the input-output circuit 108. By setting a command in this register, for instance, the AND gates 136, 140, 144 and 156 are all turned on or off. In this way, a command is set in the MOD register 160, thus making it possible to stop or start the output of the injector control circuit, the ignition pulse generator circuit 138 and the control circuit ISCC.

A specific example of a program system is shown in FIG. 8. In the drawing, the management program OS includes an initial processing program 202, an interruption processing program 206, a task dispatcher 208 and a macroscopic processing program 228.

The interruption processing program 206 includes various interruption processing programs. In the initial interruption process 602, initial interrupts (interruptions) are generated twice for the four cylinder engine, namely, a number corresponding to half the number of engine cylinders, for each engine rotation cycle, in response to an initial interruption signal generated in synchronism with the engine crankshaft rotation. This initial interruption causes the fuel injection time calculated at the EGI task 612 to be set in the EGI register of the input-output interface circuit 108. The AD conversion interruption processes 604 are of three types including the AD converter 1 interruption, the AD converter 2 interruption and AD converter 3 interruption. The AD converter 122 has an accuracy of 8 bits and is used as an input for a source voltage, cooling water temperaure, intake air temperature and working adjustment. The AD converter 122 designates an input point for the multiplexer 120 while at the same time starting the conversion, generates the AD conversion 1 interruption after the conversion. This interruption is used only before the cranking. The AD converter 128, on the other hand, is used for the input of the air flow rate and generates an AD conversion 2 interruption after conversion. This interruption is also used only before cranking.

Further, the AD converter 172 is used as an input of the combustion pressure signal Pi detected from the combustion pressure sensor 170, and generates an AD converter 3 interruption after AD conversion.

In the interval interruption processing program 606, the interval interruption signal is generated at intervals of, say, 10 ms set in the interval register. This signal is used as a time monitoring basic signal for the task to be started at predetermined intervals. In response to this interruption signal, the soft timer is updated and the task that has reached a predetermined period is started. In the reference interruption processing program 607, on the other hand, the torque W determined at the task ADIN3 (AD conversion end interruption processing task) started by the AD converter 3 interruption (after AD conversion) is stored in the random access memory 106 on the one hand and the symbol of the integration factor in the calculation process of the torque W is determined on the other hand. In the ENST interruption processing program 608, an engine stop condition is detected. Upon detection of the initial interruption signal, a count is started and when the next initial interruption signal fails to be detected within a predetermined time, say, one second, an ENST interruption occurs. When the ENST interruption occurs thrice, namely, the initial interruption signal fails to be detected after the lapse of three seconds, for instance, an engine stop condition is considered to have occurred so that the power supply to the ignition coil and the fuel pump are stopped. After these operations, the process is suspended until the starter switch 152 is turned on. The processes for the above-mentioned interruption factors are shown in Table 1.

TABLE 1

General processes and corresponding interruption factors

| Interruption factor | Process |
|---|---|
| Initial (INTL) | Fuel injection time set in register EGI |
| AD converter 1 | Task ADIN1 started |
| AD converter 2 | Task AC for air amount signal processing started |
| AD converter 3 | Task ADIN3 started |
| Interval (INTV) | Start periods of tasks IGN, ADIN2, EGI, MONIT, ADIN1, ADIN3, AFSIA and ISC to be started at regular intervals are checked, and the tasks that have reached the predetermined period are started. |
| ENST | The engine stop is processed and the initial condition is restored |
| REF | The torque W obtained at task ADIN3 is stored in random access memory |

The initial processing program 202 and the macroscopic processing program 228 are processed as mentioned above.

The tasks started by the above-mentioned various interruptions include the air amount signal processing task (hereinafter sometimes referred to as AS task), the fuel injection control task (hereinafter sometimes referred to as EGI task) and the start monitor task (hereinafter sometimes referred to as MONIT task) which belong to the task level 0; the AD1 input task (hereinafter sometimes referred to as ADIN1 task) and the time factor processing task (hereinafter sometimes referred to as AFSIA task) which belong to task level 1; and the idle rotation control task (hereinafter sometimes referred to as ISC task), the correction calculation task (hereinafter sometimes referred to as HOSEI tasks) and the pre-start processing task (hereinafter sometimes referred to as ISTRT task) which belong to task level 2.

The assignment of the task levels and the task functions are shown in Table 2.

TABLE 2

Task level assignment & task junctions

| Level | Program | Task No. | Functions | Starting cycles |
|---|---|---|---|---|
| 0 | OS | | Engine rotation interruption control | Min. 5 ms |
| 1 | | | Other OS processing | |
| 0 | AC | 0 | V fetch prohibition, $(V)^2$ calculated, $(V)^2$ integrated, averaged Acceleration control Fuel cut | 10 ms |
| | EGI | 1 | Fuel injection time control CO adjustment | 20 ms |
| | MONIT | 3 | Starter switch monitored (OFF) Starting fuel injection time control Soft timer start and stop | 40 ms |
| | IGN | | Ignition timing control | ms |
| 1 | ADIN1 | 4 | AD converter 1 input, compared, filtered | 50 ms |
| | AFSIA | 6 | After start, after-idling, after-acceleration Time factor control | 120 ms |
| | ADIN3 | 5 | AD converter 3 input | ms |
| 2 | ISC | 8 | Idling rotational speed control | 200 ms |
| | HOSEI | 9 | Correction factor calculated | 300 ms |

TABLE 2-continued

| | | Task level assignment & task junctions | | |
|---|---|---|---|---|
| Level | Program | Task No. | Functions | Starting cycles |
| | ISTRT | 11 | EGI initial value calculated<br>Starter switch monitored (ON)<br>Soft timer start and stop<br>Fuel pump, I/O LSI started | 30 ms |

As is clear from Table 2, the starting cycles of the tasks started by the interruptions are predetermined and these data are stored in the read-only memory 104.

Figure 9:
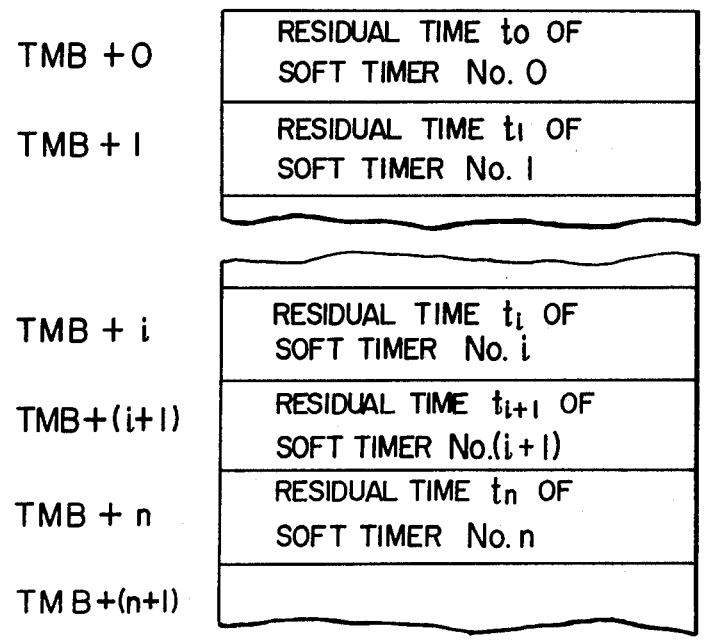
FIG. 9 is a diagram showing a soft timer table provided in a RAM.
Figure 11:
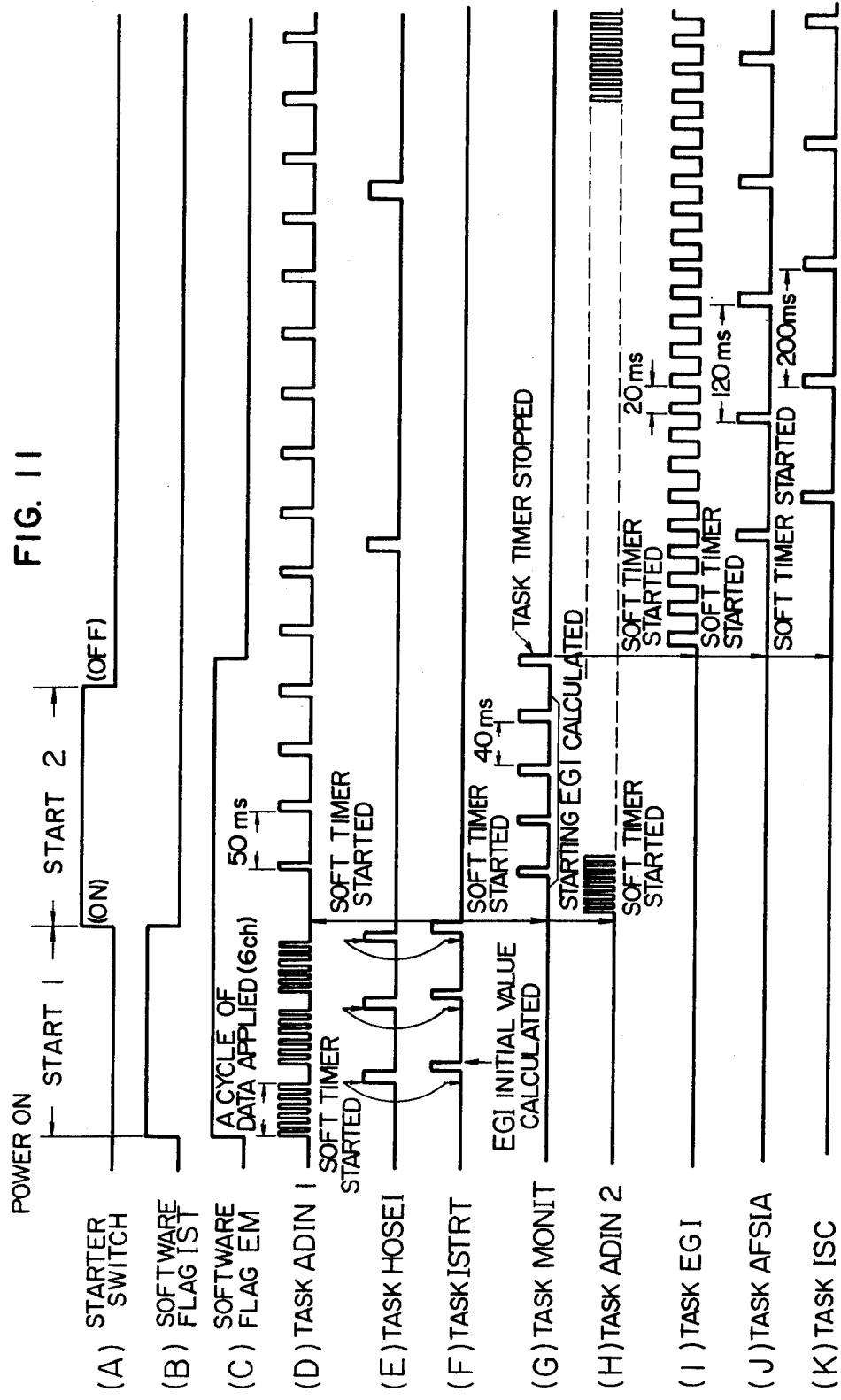
FIG. 11 is a timing chart showing the manner in which the various tasks are started and stopped in accordance with the engine operating conditions.

Explanation will be made now of the interval interruption process with reference to FIGS. 9 to 11. FIG. 9 shows a soft timer table provided in the random access memory 106. This soft timer table includes as many timer blocks as the different starting cycles started by the various interruptions. A timer block indicates a storage area to which the time data on the starting cycle of the task stored in the read-only memory 104 is transferred. In this drawing, TMB stored in the extreme left indicates a top address of the soft timer table in the random access memory 106. At the time of engine start, the time data on the starting cycle is transferred from the read-only memory 104 to each timer block of this soft timer table where the data is stored. Such data are generated, for instance, integral multiples of 10 ms providing intervals of interval interruptions.

FIG. 10 shows a process flow of the interval interruption process 606. In this drawing, when the program is started at the step 626, the soft timer table provided in the random access memory 106 is initialized at the step 628. Specifically, the data i in the index register is reduced to zero to thereby check the residual time $T_1$ stored in the timer block of address TMB+0 of the soft timer table. In this case, $T_1 = T_0$. Next, it is decided whether or not the soft timer checked at the step 628 is off at the step 630. In other words, where the residual time $T_1$ stored in the soft timer table is zero, it is decided that the soft timer is off so that it is decided that the task to be started by this soft timer is off, with the result that a jump is made to the step 640 for updating the soft timer table.

When the residual time $T_1$ of the soft timer table is not zero, on the other hand, transfer is made to the step 632 for updating the residual time of the timer block. Specifically, the residual time $T_1$ is decremented by 1. At step 634, it is decided whether or not the soft timer of the timer table has reached the starting cycle. Specifically, if the residual time $T_1$ is zero, it is decided that the starting cycle has been reached and transfer is made to the step 636. When it is decided that the soft timer has not reached the starting cycle, on the other hand, a jump is made to the step 640 for updating the soft timer table. Where the soft timer table has reached the starting cycle, the residual time $T_1$ of the soft timer table is initialized at the step 636. In other words, the time data on the starting cycle of the particular task is transferred from the read-only memory 104 to the random access memory 106. After initializing the residual time $T_1$ of the soft timer table at step 636, the starting of the task associated with the soft timer table is demanded at the step 638. Next, at step 640, the soft timer table is updated. Specifically, the data in the index register is incremented by +1. Further, it is decided whether or not all of the soft timer tables have been checked at the step 642. Specifically, the embodiment shown in FIG. 9 includes N+1 soft timer tables. Therefore, where the data i in the index register is N+1, it is decided that all the soft timer tables have been checked so that the interval interruption processing program 606 is completed at the step 644. When it is decided that all the soft timer tables have not been checked at the step 642, on the other hand, transfer is made back to the step 630 for executing the process similar to the one mentioned above.

As described above, the starting of the task is demanded in accordance with the various interruptions, and on the basis of this demand, the particular task is executed. Notwithstanding this, all the tasks listed in Table 2 are not always executed, but the time data on the starting cycles of the tasks stored in the read-only memory 104 according to the engine running condition are selected and transferred to and stored in the soft timer table of the random access memory 106. Assuming that the starting cycle of a given task is 20 ms, for instance, the task is started at intervals of 20 ms. If this task is required to be started continually according to the running conditions, the soft timer table for the particular task is always updated and initialized. Next, the manner in which the above-mentioned tasks are started and stopped by the various interruptions according to the engine running conditions will be explained with reference to the time chart of FIG. 11. When power is applied to the system by the operation of the starter switch 152, the central processing unit is actuated so that the software flag IST and the software flag EM are raised to 1. The software flag IST is for indicating that the engine is in a condition prior to being started, while the software flag EM is for prohibiting the ENST interruption. These two flags make it possible to decide whether the engine is in a condition prior to being started, being started or after being started. When power is applied by the operation of the starter switch 152, the task ADIN1 is first started so that the data required for engine start including the cooling water temperature, battery voltage and other input data are applied from the sensors through the multiplexer 120 to the AD converter 122. Each time these data are applied to the AD converter 122, the task HOSEI (correction) is started so that the correction calculation is effected on the basis of the input data. Also, each time the data from the various sensors are applied to the AD converter 122 from the task ADIN1, the task ISTRT is started and the amount of fuel injection required during engine start is calculated. The above-mentioned three tasks, namely, the task ADIN1, task HOSEI and the task ISTRT are started by the initial processing program 202.

When the starter switch 152 is turned on as shown in FIG. 11(A), three tasks including the task ADIN1, the task MONIT and the task ADIN2 as shown in (D), (G) and (H) are started by the interruption signal of the task ISTRT shown in FIG. 11(F). In other words, these tasks are to be executed only during the period (of engine cranking) when the starter switch 152 is on. During this period, the time data on the pre-determined starting cycles are transferred to and stored in the soft timer tables associated with the respective tasks in the random access memory 106 from the read-only memory 104. Also, during this period, the residual time $T_1$ of the starting cycle of the soft timer table is initialized and the setting of the starting cycle is repeated. The task MONIT is for calculating the amount of fuel injection at the time of engine start and is not required after engine start. After execution of the task a predetermined number of times, therefore, the starting of the soft timer is stopped, and other tasks required after the engine start are started in response to the stop signal produced after completion of the particular task. The task is stopped by the soft timer by storing zero in the soft timer associated with the task or clearing the data in the soft timer in response to the signal indicative of the end of the particular task at the time of decision upon completion of the task. Thus, the start and stop of the task is easily effected by the soft timer, thereby making possible efficient and reliable control of a plurality of tasks with different starting cycles.

Figure 12:
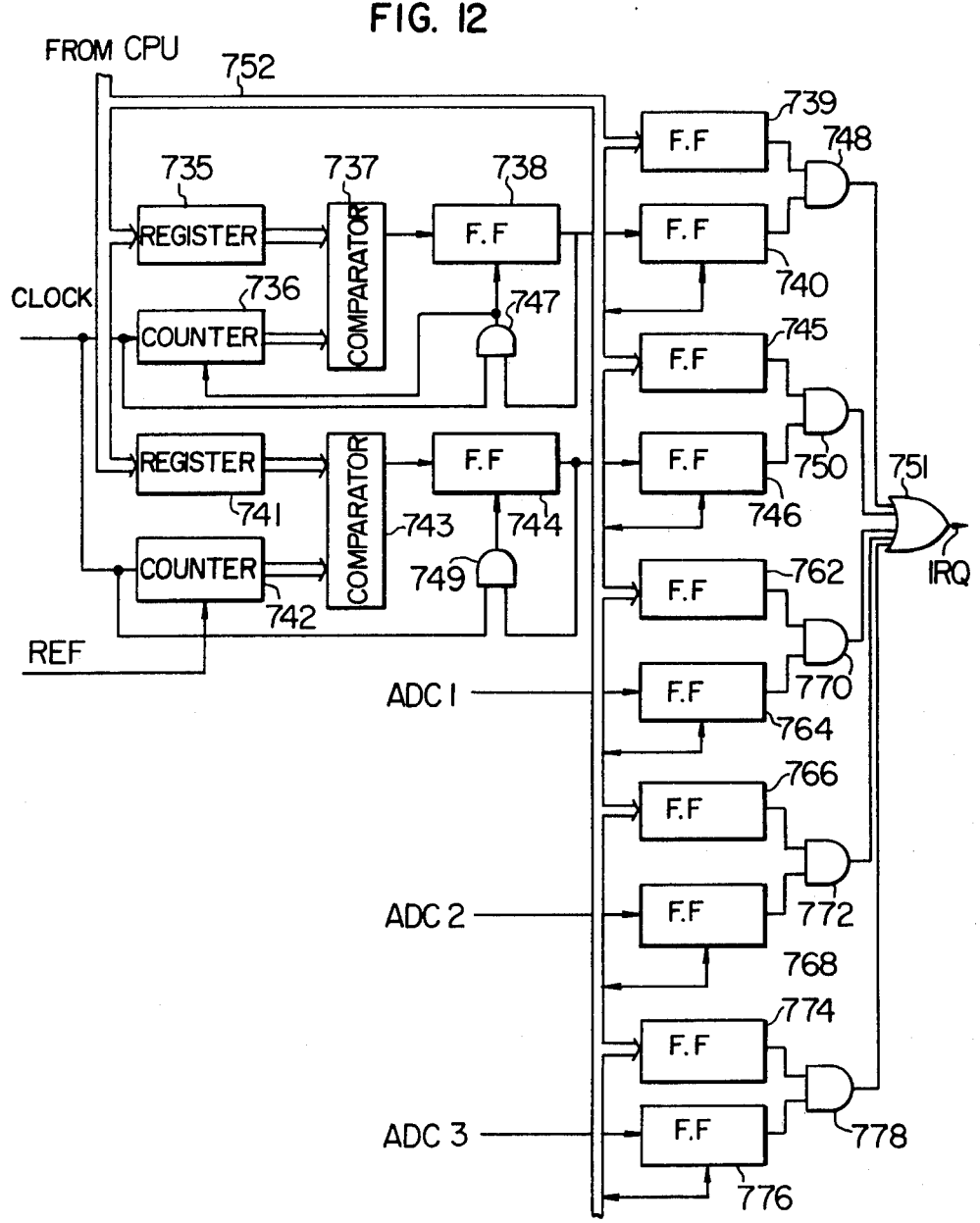
FIG. 12 shows an interruption IRQ generator circuit.

An IRQ generator circuit is shown in FIG. 12. A register 735, counter 736, comparator 737 and flip-flop 738 make up an interval IRQ generator circuit, and the cycle of generation of interval IRQ, say, 10 ms in this embodiment, is set in the register 735. On the other hand, a clock pulse is set in the counter 736, and when this count coincides with the data in the register 735, the flip-flop 738 is set. As a result, the counter 736 is cleared so that the count is resumed. In this way, the interval IRQ is generated at regular time intervals of 10 msec.

A register 741, counter 742, comparator 743 and flip-flop 744 make up an ENST IRQ generator circuit for detecting an engine stop. The register 741, the counter 742 and the comparator 743, which operate the same way as mentioned above, generate an ENST IRQ when the count reaches the value of the register 741. During the engine rotation, however, the counter 742 is cleared by the REF pulse generated from the crank angle sensor at regular intervals of a predetermined crank angle, and the count value fails to reach the value of the register 741, so that the ENST IRQ is not generated.

The interval IRQ generated in the flip-flop 738, the ENST IRQ generated in the flip-flop 744, and the IRQ generated in the first analog-digital converter, second analog-digital converter and the third analog-digital converter are set respectively in flip-flops 740, 746, 764, 678 and 776. A signal indicating whether or not the IRQ is generated or prohibited is set in flip-flops 739, 745, 762, 766 and 774. When a "high" signal is set in the flip-flops 739, 745, 762, 766 and 774, AND gates 748, 750, 770, 772 and 778 become active, and upon generation of the IRQ, OR gate 751 immediately generates an IRQ.

In this way, depending on whether the "high" of "low" signal is applied to the flip-flops 739, 745, 762, 766 and 774, the generation of IRQ is prohibited or the prohibition thereof is cancelled. When an IRQ is generated, on the other hand, the cause of IRQ generation is clarified by fetching the data in the flip-flops 740, 746, 764, 768 and 776 into the central processing unit 102.

When the central processing unit 102 begins to execute the program in accordance with the IRQ, the particular IRQ signal is required to be cleared, and therefore one of the flip-flops 740, 746, 764, 768 and 776 associated with the IRQ that have started the execution is cleared.

Prior to describing an embodiment of an ignition timing control method according to the present invention, the fetching process of obtaining data corresponding to the torque W required for ignition timing control will be described with reference to FIGS. 13 to 19. The essential parts of the control circuit for processing the combustion pressure signal among the control systems shown in FIG. 7 are shown in FIG. 13. In this drawing, angle data of a predetermined angle (such as 10 degrees) is applied to the sample crank angle synchronous set register SCCSR 180 from the central processing unit 102.

On the other hand, the counter 182 is supplied with a position pulse generated at regular intervals of a predetermined crank rotational angle such as one degree. The comparator 184 compares the output of the sample crank angle synchronous set register 180 with the output of the counter 182 and produces a pulse at regular intervals of crank angle, namely, each time the angle data set in the sample crank angle synchronous set register 180 coincides with the count output of the counter 182. The output of the comparator 184 is applied through the OR gate 188 to the reset terminal of the counter and clears the counter 182. This signal starts the analog-digital converter 172 provided in the third analog-digital converter circuit while at the same time it is applied to the sample angle indication signal 186.

Among the REF pulses produced from the angle sensor 146, the REF pulse generated at the bottom dead center in a cycle of engine rotation is applied through the sample angle indication circuit 186 or the OR gate 188 to the counter 182 and used as a reset signal. The analog-digital converter circuit 172 in the third analog-digital converter is adapted to be started at intervals of a predetermined angle set in the sample crank angle synchronous set register from the crank angle corresponding to the bottom dead center in a cycle of engine rotation. The sample angle indication circuit 186 fetches the output pulses from the comparator 184, counts them and informs the central processing unit 102 of the present crank angle.

The third analog-digital converter, on the other hand, is started by the output pulse from the comparator 184 and fetches and subjects to AD conversion the combustion pressure signal Pi produced from the combustion pressure sensor 170. Upon completion of the AD conversion, the third analog-digital converter applies the AD conversion end interruption signal AD END IRQ to the central processing unit 102. The central processing unit, on the other hand, which receives the AD conversion end interruption signal from the third analog-digital converter, receives the AD-converted combustion pressure data PiD from the third analog-digital converter.

FIG. 14 shows a data processing flow chart for the AD conversion end interruption. In this embodiment, it is assumed that each cylinder of a four-cylinder engine is provided with the combustion pressure sensor 170 in FIG. 13. In this flow chart, upon generation of an AD conversion end interruption at step 800, the combustion pressure data PiD that is the output of the third analog-digital converter is supplied to (or fetched into) the central processing unit 102 at the step 802. The combustion pressure data PiD means the i-th digitized pressure signal value. At the step 804, the output from the sample angle indication circuit 186 is received and the sample angle $\theta$ is fetched.

Further, it is decided at steps 806 and 808 whether or not the sample angle $\theta$ fetched at step 804 is included in a specified section ($B \leq \theta \leq D$) in the combustion pressure characteristic of the compression combustion process shown in FIG. 2. In other words, at step 806, the sample angle $\theta$ is compared with the crank angle B corresponding to the piston position at the time point of rapid combustion in the cylinder. If it is decided that the sample angle $\theta$ is smaller than the crank angle B, a jump is made to the step 832 and transfer is made back to the process prior to the interruption. If it is decided that the sample angle $\theta$ is larger than the crank angle B at step 806, by contrast, the process is advanced to the next step 808, followed by the decision on whether or not the sample angle $\theta$ is smaller than the crank angle D associated with the piston position at the time of completion of combustion. If it is decided that $B \leq \theta \leq D$ at step 808, transfer is made to the step 810. At the step 810, the cylinder volume change dV with the sample angle changed by $\theta$ is determined from the equation (4). Since the sectional area of the cylinder A and the stroke s are constants, it is necessary only to calculate $$\sin\theta + \frac{r}{2l}\sin 2\theta. \tag{8}$$

Since the data of calculation from equation (8) for sample angle $\theta$ are stored as a table in read-only memory 104, the calculation of equation (8) is made by searching the table for the above-mentioned data associated with the sample angle $\theta$. Further, the integration value $\Sigma P$ is calculated from the equation below at the step 812.

$$\Sigma P = PiD \times \left( \sin\theta + \frac{r}{2l}\sin 2\theta \right) \tag{9}$$

At the next step 814, it is decided whether or not the top dead center flag is set. The top dead center flag is employed for deciding whether or not the piston has reached the top dead center at the compression-combustion process in a cycle of engine rotation. When the top dead center flag is set, it is decided that the piston has reached the top dead center so that the factor of the integration value $\Sigma P$ is made positive, the torque $\Sigma P$ generated in the engine being positive. In the case where the top dead center flag is reset, on the other hand, it is decided that the piston has not reached the top dead center, and the factor of integration value is made negative, the torque generated in the engine being negative. Thus when it is decided that the top dead center flag is set at the step 814, the process is passed to the step 818 while the integration value $\Sigma P$ obtained at the step 812 is kept as it is. In the event that it is decided that the top dead center flag is reset at the step 814, on the other hand, the process is transferred to the step 816, so that the factor of integration value $\Sigma P$ obtained at step 812 is made negative and the process is then passed to the step 818.

At step 818, the previous integration value $\Sigma P$ stored in the random access memory 106 is read and the calculation shown below is made at the step 820.

$$\Sigma P \pm \left\{ PiD \times \left( \sin\theta + \frac{r}{2l}\sin 2\theta \right) \right\} \tag{10}$$

The value $\Sigma P$ calculated by equation (10) above is stored in the random access memory 106 and transfer is made back to the step before the interruption at the step 822.

In the event that it was decided in step 808 that the sample angle $\theta$ is larger than the crank angle D on the other hand, the process is passed to the step 824, where the prevailing integration value $\Sigma P$ is stored as a final integration value Wn in the random access memory 106. Further, at the step 826, the integration value $\Sigma P$ is cleared, and at the step 828, the data n stored in the soft counter provided in the random access memory 106 is incremented by $+1$. At the next step 830, it is decided whether or not the data n in the soft counter is smaller than $n_{max}$. In the case of a four-cylinder engine, $n_{max}$ is 4. If it is decided that the data in the soft counter is smaller than $n_{max}$ at step 830, the process is passed to the step 822 or to the stage before interruption. When it is decided at step 830 that the data in the soft counter n is not smaller than $n_{max}$, on the other hand, the process is passed to the step 832, where the average W of the final integration value Wn determined at step 824 is stored in the random access memory 106, followed by the transfer back to a process before interruption at step 822.

FIG. 15 shows an AD conversion end interruption process with only a specific engine cylinder provided with the combustion pressure sensor. When an AD conversion end interruption is generated at step 842, the combustion pressure data PiD produced from the third analog-digital converter is fetched to the central processing unit 102 at step 842, followed by the step 844 where the sample angle $\theta$ is introduced into the central processing unit 102. Further, at steps 846 and 848, it is decided whether or not the sample angle $\theta$ is such that the crank angle $B \leq \theta \leq$ crank angle D. If it is decided at steps 846 and 848 that the sample angle is not included in the above-mentioned range, the combustion pressure data PiD is not required to be calculated, and therefore the process is returned to the step 862 that is a stage before interruption. If it is decided that the sample angle $\theta$ is included in the above-mentioned range, that is, $B \leq \theta \leq D$, the process is passed to the step 850, where the calculation of the equation below is made.

$$\alpha = \sin\theta + \frac{r}{2l} \cdot \sin 2\theta \tag{11}$$

The calculation value $\alpha$ due to the equation (11) above is stored in advance in the read-only memory 104 as a table, and such a value $\alpha$ corresponding to the sample angle $\theta$ fetched at the step 844 is determined by searching the table. Further, at step 852, the calculation of the integration value $\Sigma P$ is made. This calculation is made as a product of the combustion pressure data PiD fetched at step 842 and the calculation value $\alpha$ determined at step 850. At step 854, it is decided whether or not the top dead center flag is set. If the top dead center flag is set, the process is passed to the step 858. If the top dead center is reset, on the other hand, the factor of integration value $\Sigma P$ obtained at step 852 is made negative at step 856 and the process is then passed to the next step 858. At step 858, the previous integration value $\Sigma P$ is read out of the random access memory 106, followed by the next step 860 where the calculation shown below is made with the integration value PiD×α obtained at the step 852.

$$\Sigma P \pm PiD \times \alpha \qquad (12)$$

This subtracting calculation of equation (12) is made only when it is decided at step 854 that the top dead center flag is reset. The value newly calculated from the equation (12) is stored as an integration value ΣP in the random access memory 106, followed by the next step 862 where the process is returned to a stage before interruption.

Figure 16:
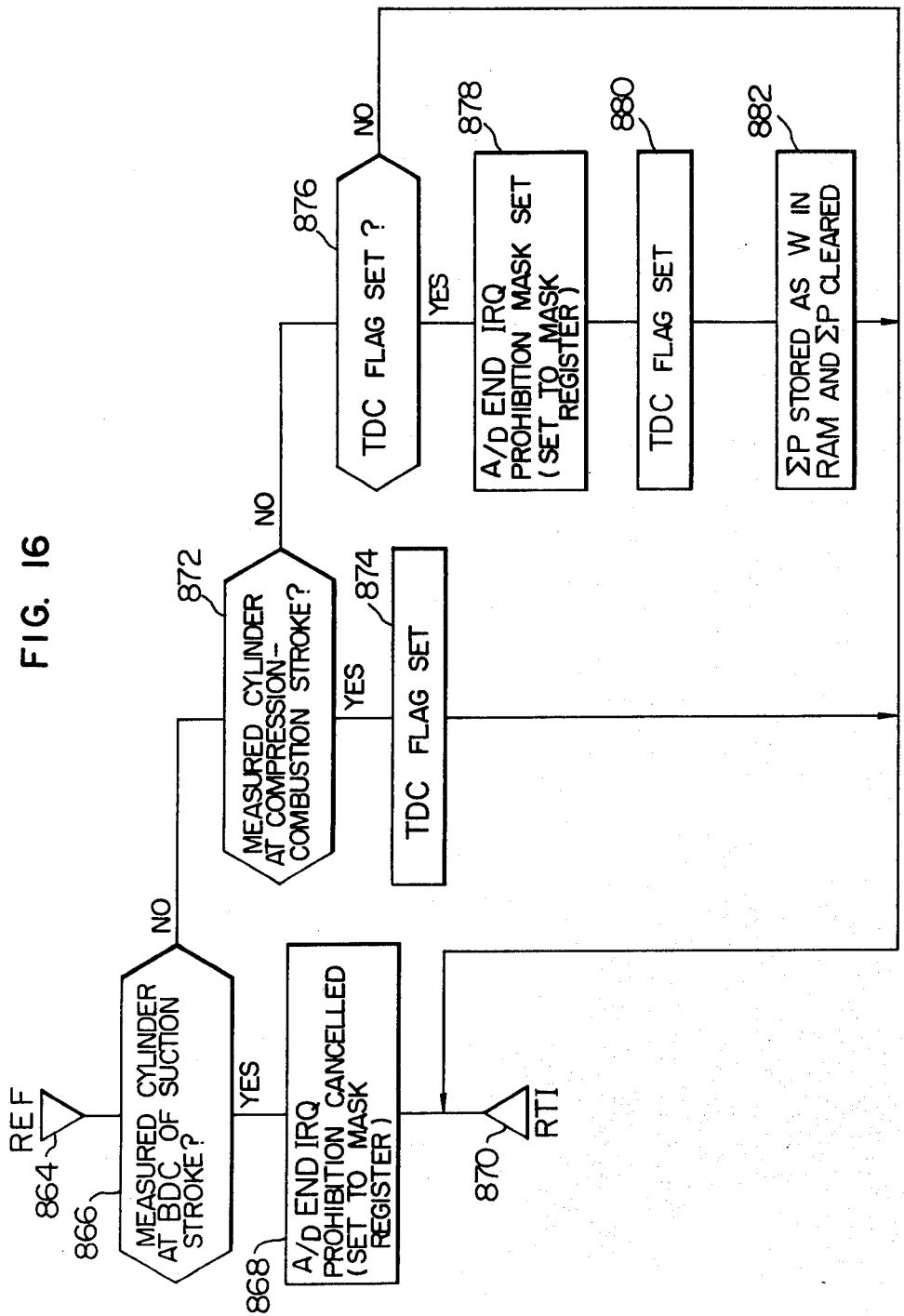
FIG. 16 is a diagram showing the process flow of the REF interruption processing program executed in the embodiment of FIGS. 13 to 15.

The process flow of the REF interruption is shown in FIG. 16. In this drawing, upon generation of an REF interruption at step 864, it is decided at the next step 866 whether or not the cylinder piston providing an object of measurement has reached the bottom dead center of the suction stroke. This decision is made by counting the REF pulses produced from the angle sensor 146. In the case of a four-cylinder engine, for example, an REF pulse is produced every 180 degrees, and therefore if the data CNR in the counter for counting the REF pulses (not shown) is 2, it means that the bottom dead center of the suction stroke has been reached, so that the compression-combustion process is entered at CNR=3. Thus in order that the cylinder providing an object of measurement in the step 866 may enter a suction stroke, the combustion pressure data PiD produced from the combustion pressure sensor 170 mentioned above is acquired, and for this purpose, the prohibition of the AD conversion end interruption is cancelled at the next step 868, followed by the next step 870 where the process is returned to a stage before interruption.

In the case where it is decided at step 866 that the cylinder piston providing an object of measurement has not yet reached the bottom dead center of suction stroke, on the other hand, the process is passed to the step 872, where it is further decided whether or not the cylinder providing an object of measurement is in the compression-combustion stroke. This is equivalent to the decision as to whether or not the data CNR in the counter for counting the REF pulses produced from the angle sensor 146 are 3 as described above. It is assumed that the counter begins to count at the top dead center of the suction stroke and the data CNR in the counter is cleared at the time point when the exhaust stroke is entered. If it is decided that the cylinder providing an object of measurement has reached the compression-combustion stroke at step 872, the process is passed to the step 874, where the top dead center flag is set, followed by the step 870 where transfer is made back to the process before interruption.

If it is decided at step 872 that the cylinder providing an object of measurement has not reached the compression-combustion stroke, on the other hand, the process is passed to the step 876, where it is decided whether or not the top dead center flag is set. If it is decided that the top dead center flag is set at step 876, the process is passed to the next step 878 for prohibiting the AD conversion end interruption. At the next step 880, the top dead center flag is reset, and at step 882, the integration value ΣP calculated in the above-mentioned AD conversion end interruption process is stored as a torque W in the random access memory 106 and the integration value ΣP is cleared, followed by the transfer to the step 870. Similarly, in the case where it is decided that the top dead center flag is reset at step 876, a jump is made to the step 870 where transfer is made back to the process before interruption.

Figure 17:
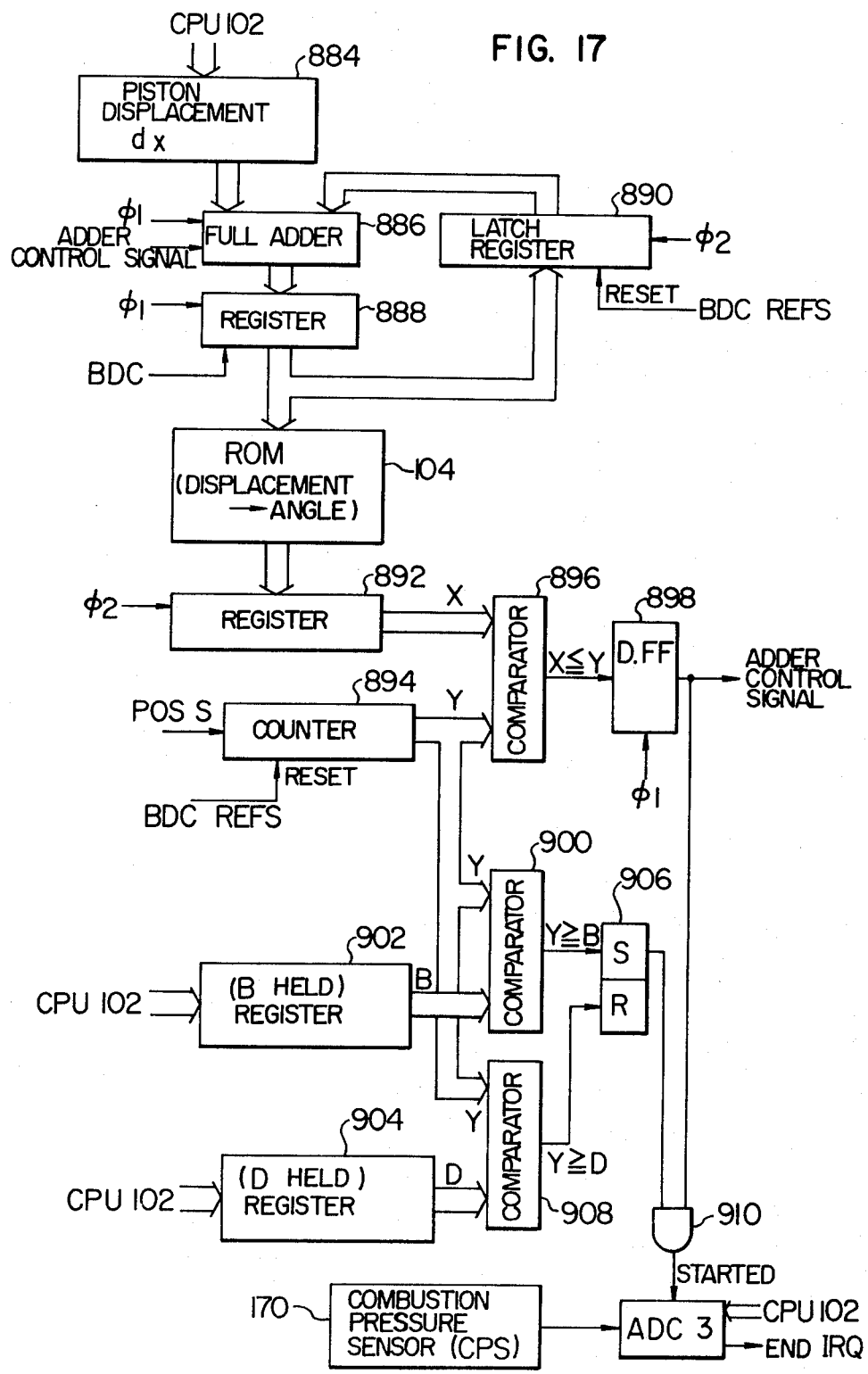
FIG. 17 is a block diagram showing another embodiment of the pressure signal processing circuit.

Another embodiment of the pressure signal processing circuit of FIG. 13 is shown in FIG. 17. Unlike the embodiment of FIG. 13 is which the combustion pressure data PiD from the combustion pressure sensor 170 is processed by sampling the pressure Pi in response to the crank angle signal, the embodiment under consideration is such that the detection output Pi of the combustion pressure sensor 170 is sampled at each predetermined displacement dx of piston, that is, for each piston stroke signal. In the embodiment of FIG. 13, the range of measurement of torque W is determined by the processing in the central processing unit, while according to the embodiment under consideration it is accomplished by hardware.

In FIG. 17, upon application of the predetermined piston displacement dx from the central processing unit 102 to a full adder 886 through a clock signal $\phi_1$ and an adder control signal, the result of addition at the full adder 886 is transferred to a register 888 at the timing of the clock signal $\phi_1$. The displacement dx of piston held in the register 888 is coupled to the read-only memory 104 and a latch register 890, from which the displacement dx held at the time of the clock signal $\phi_1$ is applied to the full adder 886. Thus each time of addition of the predetermined displacement dx, the register 888 applies the integration value Σdx to the read-only memory 104 and the register 890.

A table of conversion of the piston displacement dx into the crank angle $d\theta$ is stored in advance in the read-only memory 104. The read-only memory 104 searches for the crank angle $d\theta$ corresponding to the output of the register 888 with reference to the table, and sets the particular angle in a register 892.

On the other hand, a counter 894 counts the position pulses, and the comparator 896 compares the output X of the register 892 with the output Y of the counter 894. The register 888, the latch register 890 and the counter 894 are reset by the REF pulses generated at bottom dead center. In the comparator 896, the output X of the register 892 is compared with the output Y of the counter 894, and when the counter output Y becomes equal to the register output X, a pulse is applied to data flip-flop 898. The data flip-flop 898 produces a logic "1" signal at the timing of the clock signal $\phi_1$. This logic "1" signal is applied to AND gate 910 as a signal for starting the analog-digital converter 172 provided in the third analog digital converter circuit or as an adder control signal.

For the purpose of determining the range of measurement of the torque W, the crank angle data corresponding to the point B or D in FIG. 2 is transferred from the central processing unit 102 to registers 902 and 904 and held therein. The outputs of the registers 902 and 904 are applied to comparators 900 and 908 respectively, while the output Y of the counter 894 is also applied to the comparators 900 and 908 respectively. Only when the output Y of the comparator 894 is larger than the output B of the register 902, does the comparator 900 apply a pulse signal to set terminal S of SR flip-flop 906. Also, only when the output Y of the counter 894 is larger than the output of the register 904, does the comparator 908 apply a pulse signal to the reset terminal R of the SR flip-flop 906. Thus only when the output Y of the counter 894 for counting the position pulses is between the output B of the register 902 and the output D of the register 904, that is, B≦Y≦D, is a logic "1" signal applied from the set terminal S of the SR flip-flop 906 to one of the input terminals of AND gate 910. As a result, the AND gate 910 applies a start signal to the analog-digital converter 172 in the third analog digital-converter circuit at each displacement dx of piston in the case where the crank angle $\theta$ is in the range B≦$\theta$≦D.

In this way, the analog-digital converter 172 in the third analog-digital converter circuit is actuated, fetches the combustion pressure signal Pi from the combustion pressure sensor 170, converts it into a digital signal, and after the end of AD conversion, applies an AD conversion end interruption signal to the central processing unit 102. The central processing unit 102, in response to the AD conversion end interruption signal, fetches the combustion pressure data PiD.

Figure 18:
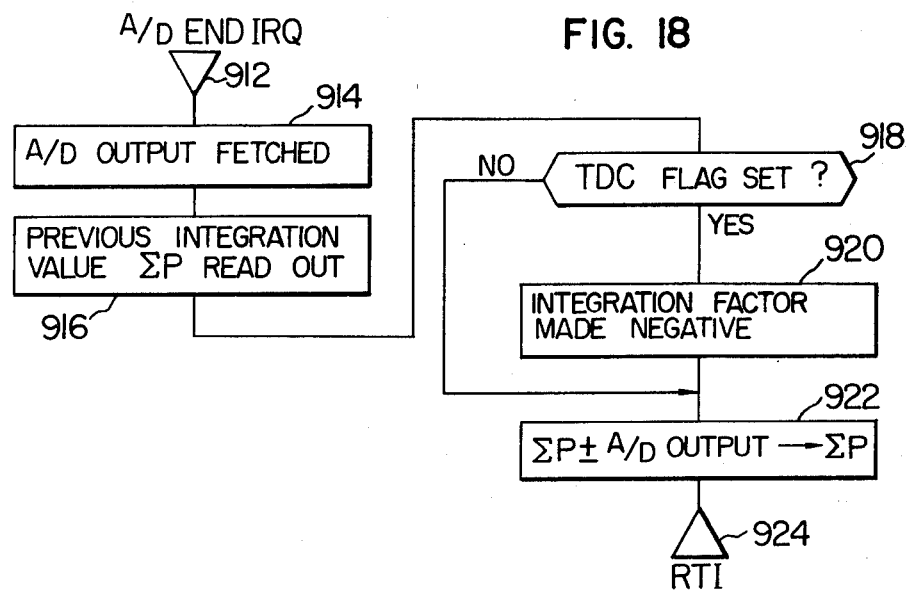
FIG. 18 is a diagram showing the process flow of the AD conversion end interruption processing program executed in the pressure signal processing circuit of FIG. 17.
Figure 19:
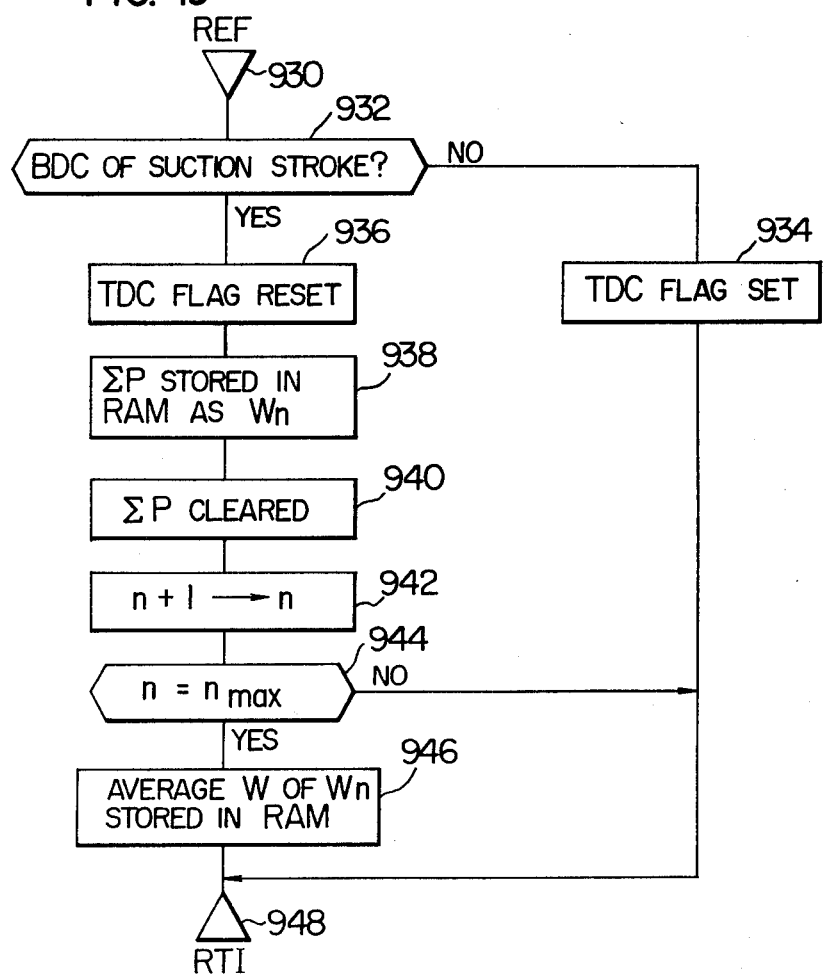
FIG. 19 is a diagram showing the process flow of the REF interruption processing program executed in the pressure signal processing circuit of FIG. 17.

The signal processing operation for sampling the combustion pressure signal Pi of the combustion pressure sensor 170 at each piston displacement dx will be explained with reference to FIGS. 18 and 19. FIGS. 18 and 19 show the case in which each engine cylinder is provided with a combustion pressure sensor. The process flow of the AD conversion end interruption is shown in FIG. 18. In this drawing, upon generation of an AD conversion end interruption at step 912, the combustion pressure data PiD is fetched from third analog-digital converter at the step 914, followed by the next step 916 where the previous integration value $\Sigma P$ stored in the random access memory 106 is read out. Further, at the next step 918, it is decided whether or not the top dead center flag is set. If it is decided that the top dead center flat is set, the process is passed to the step 920, where the integration factor is made negative followed by the transfer to the step 922.

If it is decided that the top dead center flag is reset at the step 918, on the other hand, a jump is made to the step 922. At the step 922, the previous integration value $\Sigma P$ read out at the step 916 and the output of the analog-digital converter 172 fetched at the step 914 are added to each other. The result of this addition is stored in the random access memory 106 as a new integration value $\Sigma P$, followed by the next step where the transfer is made back to the process before interruption.

The process flow of REF interruption is shown in FIG. 19. In this drawing, upon generation of an REF interruption at step 930, it is decided at the next step 932 whether or not the cylinder piston providing an object of measurement has reached the bottom dead center of the suction stroke. If it is decided at step 932 that the cylinder piston providing an object of measurement has not reached the bottom dead center of suction stroke, the process is passed to the step 934, where the top dead center flag is set, followed by the step 948 where transfer is made back to the process before interruption.

If it is decided at step 932 that the cylinder piston providing an object of measurement has reached the bottom dead center of the suction stroke, on the other hand, the process is passed to the step 936 where the top dead center flag is reset. At the next step 938, the integration value $\Sigma P$ determined at step 922 for the AD conversion end interruption of FIG. 18 is stored as a torque Wn in the random access memory 106, followed by the next step 940 where the integration value $\Sigma P$ is cleared. Further, at the next step 942, the data n in the soft timer provided in the random access memory 106 is incremented by +1, followed by the transfer to the step 944. At the step 944, it is decided whether or not the data in the soft timer n is equal to $n_{max}$. The reference character $n=n_{max}$ denotes the total number of engine cylinders, $n_{max}$ being 4 for a four-cylinder engine. If it is decided that the data n in the soft counter has not reached $n_{max}$ at step 944, a jump is made to the step 948, where transfer is made back to the process before interruption.

It it is decided at step 944 that the data n in the soft counter is equal to $n_{max}$, on the other hand, the process is passed to the step 946, where the average value of the torque Wn stored in the random access memory 106 in the step 938, that is, the average value of the torque Wn of each cylinder in the case of a four-cylinder engine, is stored as a torque W in the random access memory 106, followed by transfer back to the process before interruption at step 948. The above-described process is concerned with the case where each of the engine cylinder is provided with a combustion pressure sensor 170. In the case where only a specific engine cylinder is provided with the combustion pressure sensor 170, on the other hand, the process of AD conversion end interruption is effected according to the process flow of FIG. 18, while the REF interruption process is executed as shown in FIG. 3. In the embodiment shown in FIGS. 17 to 19, the combustion pressure signal Pi detected from the combustion pressure sensor is adapted to be sampled at each predetermined displacement dx of the piston, and therefore according to this embodiment, unlike in the embodiment shown in FIGS. 13 to 16, the calculation for converting the angle signal of the crank angle sensor into the piston displacement is not required.

Figure 20:
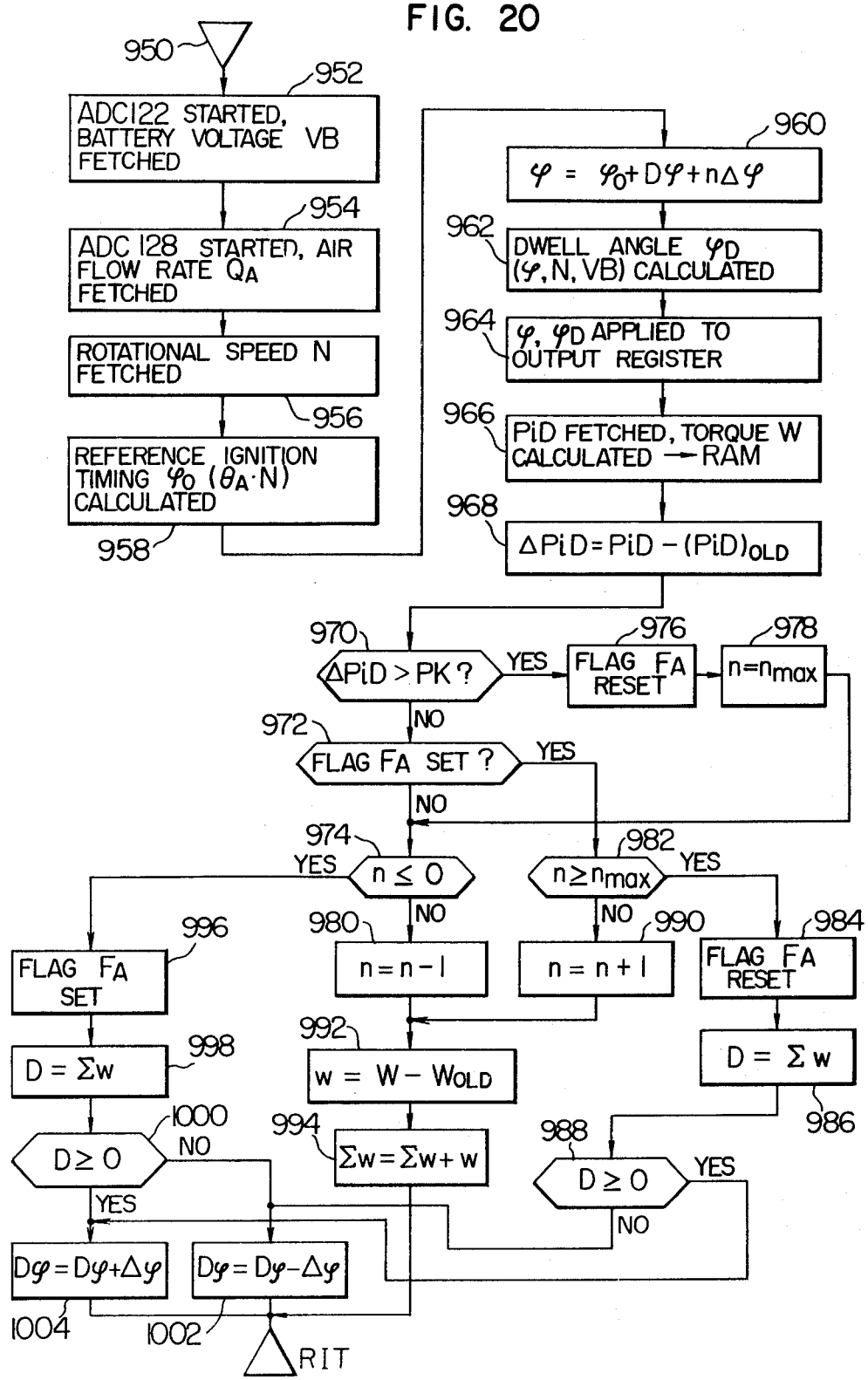
FIG. 20 is a flowchart showing the processes of the ignition timing control program according to the present invention.

A method of ignition timing control according to the present invention will be described with reference to FIG. 20 to FIGS. 22A and 22B. FIG. 20 shows an ignition timing control program started by an REF interruption. In this drawing, when the program is started at step 950, the analog-digital converter 122 is actuated at the next step 952, so that the battery voltage VB detected by the battery voltage sensor 132 is subjected to analog-digital conversion by the analog-digital converter 122 through the multiplexer 120, and fetched into the central processing unit 102. At the next step 954, the analog-digital converter 128 is actuated, and the air flow rate $Q_A$ detected by the air flow sensor 24 is subjected to analog-digital conversion by the analog-digital converter 128, and fetched into the central processing unit 102. At the step 956, the engine rotational speed N is fetched into the central processing unit 102, followed by the next step where the basic ignition timing $\phi_0$ is calculated. The basic ignition timing $\phi_0$ is a function of the air flow rate $Q_A$ and the engine rotational speed N. The value of the basic ignition timing $\phi_0$ determined by the air flow rate $Q_A$ and the engine rotational speed N on the basis of experimental data obtained in advance by measurement are stored as a table in the read-only memory 104. At the step 958, the basic ignition timing $\phi_0$ is determined by searching the table on the basis of the air flow rate $Q_A$ and the engine rotational speed N under actual engine running conditions. Further at the step 960, the ignition timing $\phi$ is determined from the equation below.

$$\phi = \phi_0 + D\phi + n\Delta\phi \qquad (13)$$

where $D\phi$ is the correction amount of ignition timing for correcting the ignition timing stepwise to attain the maximum torque W generated in the engine, $\Delta\phi$ is the minimum correction advance unit, and n is the number of steps of advance in ignition timing control.

At the next step 962, the dwell angle $\phi_D$ is calculated. The dwell angle $\phi_D$ is a function of the ignition timing $\phi$, the engine rotational speed N and the battery voltage $V_B$, and is calculated from the data obtained at the steps 952, 956 and 960 respectively. At the next step 964, the ignition timing $\phi$ and the dwell angle $\phi_D$ obtained at the steps 960 and 962 are set in the registers ADV and DWL respectively. At the next step 966, the combustion pressure data PiD is introduced from the analog-digital converter 172 to the central processing unit 102 to thereby calculate the torque W, the result of which is stored in the random access memory 106. Further at the step 968, the deviation $\Delta$PiD of the combustion pressure data fetched at the step 966 is calculated from the equation below.

$$\Delta PiD = PiD - (PiD)_{old} \tag{14}$$

where PiD is combustion pressure data fetched at the present time and (PiD)$_{old}$ is the combustion pressure data fetched the previous time.

At the step 970, it is decided whether or not the pressure deviation $\Delta$PiD determined at the step 968 is larger than a predetermined set value PK. The predetermined value PK indicates a pressure change associated with the knocking of the engine, and is a constant determined by the operation of the engine. In other words, a decision as to whether or not the engine knocking has occurred is made at the step 970. If it is decided that the pressure deviation $\Delta$PiD is larger than the setting PK at the step 970, the process is passed to the step 976, where the flag $F_A$ is reset. The flag $F_A$ is employed for deciding whether or not the ignition angle should be advanced until engine knocking occurs. Since it is already decided that the engine has developed knocking at the step 970, the flag $F_A$ is required to be reset. At the next step 978, the number of advance steps n is set at the upper limit value $n_{max}$, followed by transfer to the step 974.

Figure 22A:
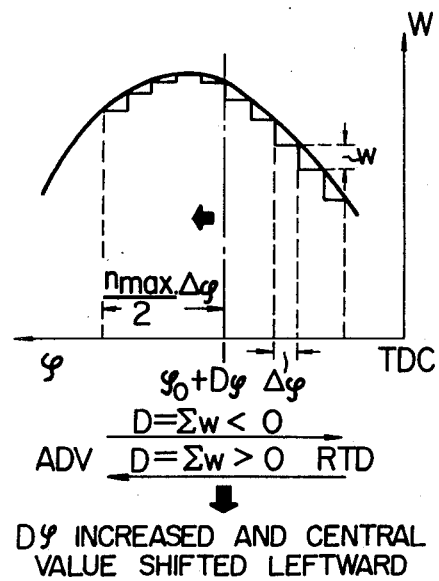
FIGS. 22A to 22B are diagrams for explaining the processes shown in FIG. 20.

If it is decided that the pressure deviation $\Delta$PiD is smaller than PK at step 970, on the other hand, the process is passed to the step 972, where it is decided whether or not the flag $F_A$ is set. If it is decided that the flag $F_A$ is set at the step 972, the process is passed to the step 982, where it is decided whether or not the number n of the advance steps has reached the upper limit $n_{max}$. If it is decided at the step 982 that the number n of advance steps has reached the upper limit value $n_{max}$, the ignition advance angle $\phi(=\phi_0+D_\phi)$ is a maximum value as seen from the characteristic of the torque W as against the ignition advance angle $\phi$ as shown in FIG. 22A, and therefore the flag $F_A$ is reset at the next step 984, followed by the step 986 where the integration value D of the torque deviation w is calculated, further followed by the step 988 where it is decided whether the integration value D is positive or negative.

In the case where it is decided at the step 972 that the flag $F_A$ is reset and that the number n of the advance steps is larger than zero at step 974, on the other hand, the process is passed to the step 980 where the number of advance steps is decremented by one, followed by the next step 992 where the torque deviation w is calculated from the equation below.

$$w = W - W_{old} \tag{15}$$

In this equation, the torque W is the one at the present time, and $W_{old}$ is the torque detected the previous time.

Further at the step 994, the torque deviation w is integrated, and the resulting integration $\Sigma w$ is stored in the random access memory 106, thus returning to the process before interruption at step 1006.

If it is decided at step 982 that the number of advance steps has not reached the upper limit value $n_{max}$, on the other hand, the process is passed to the step 990, where the data n in the soft counter provided in the random access memory 106 is incremented by +1, followed by transfer to the step 992.

Figure 22B:
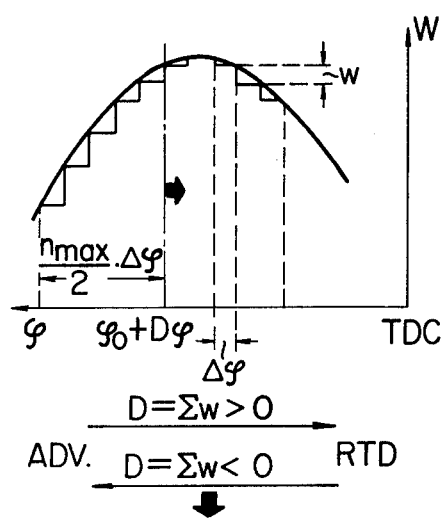

Also, if it is decided that the number n of advance steps, namely, the data in the soft counter has reached zero, at step 974, the process is passed to the step 996, where the flag $F_A$ is set, followed by the step 998 where the integration D of the torque deviation w is calculated. At the step 1000, it is decided whether the integration value D is positive or negative. In the case where the integration D of the torque deviation value w is positive, it means that the central value $\phi_0+D_\phi$ of the control width of the ignition timing $\phi$ is displaced rightward from the ignition timing $\phi$ associated with the maximum torque as shown in FIG. 22A in which case the ignition timing correction $D_\phi$ is required to be increased in order to shift leftward (advance) the central value $\phi_0+D_\phi$. In the case where the integration value D is negative, in contrast, the central value $\phi_0+D_\phi$ of the control width is displaced leftward from the ignition timing associated with the maximum torque as shown in FIG. 22B, and therefore it is necessary to shift rightward (retard) the central value $\phi_0+D_\phi$ by reducing the ignition timing correction $D_\phi$. Thus if it is decided that the integration value D is positive at the steps 988 and 1000, the process is passed to the step 1004, where the ignition timing correction $D_\phi$ is increased by the minimum correction advance unit $\Delta\phi$, which is newly stored as an ignition timing correction amount $D_\phi$ in the random access memory 106, followed by transfer to the step 1006 before interruption.

If it is decided at steps 988 and 1000 that the integration value D is negative, on the other hand, the process is passed to the step 1002, where the amount of ignition timing correction $D_\phi$ is decreased by the minimum correction advance unit $\Delta\phi$ thereby to store the ignition timing correction amount $D_\phi$ anew in the random access memory 106, followed by the transfer back to the process before interruption at step 1006.

Figure 21:
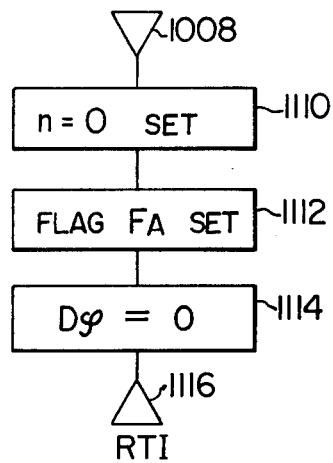
FIG. 21 is a flowchart showing the processes of the INTL (initial) interruption processing program 602.

The process flow of the initial interruption processing program 602 is shown in FIG. 21. In this drawing, upon generation of an initial interruption at step 1008, the data n in the soft counter in the random access memory 106, namely, the number n of advance steps of the ignition timing control program in FIG. 20 is set to zero at step 1001. Further at step 1112, the flag $F_A$ is set, followed by the step 1114 where the ignition timing correction among $D_\phi$ is set to zero, further followed by the step 1116 where the process is returned to the one before interruption.

What is claimed is:

1. A method of controlling the operation of an internal combustion engine comprising the steps of:
    (a) in response to prescribed engine operation conditions, establishing a base ignition timing as a function of said prescribed conditions;
    (b) generating respective first signals representative of the combustion pressure within a combustion chamber of a cylinder of said engine for respective changes of the volume of said combustion chamber;

(c) generating a second signal representative of engine output torque on the basis of the integration of said first signals generated in step (a);

(d) generating a third signal representative of an ignition timing correction value on the basis of the torque represented by said second signal; and (e) generating an ignition timing signal for controlling the combustion operation of said engine in accordance with the base ignition timing established in step (a) and said third signal generated in step (d), so as to effectively maximize said engine output torque.

2. In a method of engine control comprising the steps of obtaining the output of a sensor for detecting an engine combustion condition, determining the amount of engine control in accordance with the output of said sensor, and controlling the engine combustion condition on the basis of the amount of engine control;

the improvement wherein said step of determining the amount of engine control includes the step of:

correcting the output of said sensor in accordance with the difference in the volume of the engine combustion chamber at the time of obtaining said output of said sensor and at the previous timing of obtaining said output, wherein the amount of displacement of a piston in said combustion chamber between the previous time of obtaining the output of said sensor and the current timing of obtaining the output is calculated as data representing the change of volume of the engine combustion chamber, and the output of said sensor is corrected in accordance with the amount of displacement of the piston, and wherein the data on the pressure in the combustion chamber is obtained as the output of said sensor at each predetermined engine crank angle, the amount of volume change of the engine cylinder is determined from said crank angle, said pressure data is multiplied by said amount of cylinder volume change thereby to determine the amount of work, and the amount of engine control is determined from said amount of work.

3. A method according to claim 1, wherein step (b) comprises generating said respective first signals in accordance with respective angles of rotation of the engine crankshaft, associated with respective changes in the position of a piston within an engine cylinder.

4. A method according to claim 3, wherein step (b) comprises generating said respective first signals in response to said respective angles of rotaton of the engine crankshaft being within a prescribed range.

5. A method according to claim 3, wherein step (c) comprises deriving respective values corresponding to changes in volume of said combustion chamber on the basis of said respective angles of rotation of said engine crankshaft for which said respective first signals are generated, producing respective fourth signals representative of torque values based upon said respective first signals and said respective changes in volume values, and integrating said fourth signals to obtain said second signal.

6. A method according to claim 5, wherein step (c) comprises integrating said fourth signals in dependence upon the angle of rotation of said engine crankshaft relative to the top dead center rotation position thereof.

7. A method according to claim 5, wherein step (c) is carried out in response to said respective angles of rotation of the engine crankshaft being within a prescribed range.

8. A method according to claim 7, wherein step (c) is carried out for successive ones of the cylinders of said engine to obtain successive second signals therefor, and further includes the step of averaging said successive second signals to obtain an average second signal, and wherein step (d) is carried out on the basis of said average second signals.

9. A method according to claim 3, wherein step (b) comprises generating said respective first signals on the basis of the rotation of said engine crankshaft having reached a position corresponding to bottom dead center.

10. A method according to claim 1, wherein step (b) comprises generating said respective first signals in accordance with respective values of piston displacement within an engine cylinder.

11. A method according to claim 10, wherein step (b) includes the step of converting said respective values of piston displacement to respective values of rotation of the engine crankshaft and generating said respective first signals on the basis of said converted value of engine crankshaft rotation.

12. A method according to claim 1, wherein step (d) includes the step of adjusting said correction value so as to maximize engine torque.

13. A method according to claim 12, wherein step (d) includes the steps of monitoring the operation of said engine to detect a knocking condition thereof and incrementally adjusting said correction value on the basis of said knocking condition monitoring step.

14. A method according to claim 13, wherein said third signal is representative of an ignition advance angle correction value and step (d) includes the step of incrementally adjusting said ignition advance correction value so that said ignition timing signal generated in step (e) effectively causes said engine to produce maximum torque.

* * * * *